United States Patent
Lim et al.

(10) Patent No.: US 10,893,278 B2
(45) Date of Patent: *Jan. 12, 2021

(54) VIDEO BITSTREAM GENERATION METHOD AND DEVICE FOR HIGH-RESOLUTION VIDEO STREAMING

(71) Applicants: SK TELECOM CO., LTD., Seoul (KR); PIXTREE, INC., Seoul (KR)

(72) Inventors: Jeong-yeon Lim, Seoul (KR); Jae-seob Shin, Seoul (KR); Sung-gul Ryoo, Seoul (KR); Se-hoon Son, Seoul (KR); Hyeong-duck Kim, Suwon-si (KR); Sun-young Lee, Seoul (KR)

(73) Assignees: SK TELECOM CO., LTD., Seoul (KR); PIXTREE, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,217

(22) Filed: Jul. 9, 2019

(65) Prior Publication Data
US 2019/0335182 A1   Oct. 31, 2019

Related U.S. Application Data

(63) Continuation of application No. 16/313,623, filed as application No. PCT/KR2017/007028 on Jul. 3, 2017.

(30) Foreign Application Priority Data

Jul. 1, 2016 (KR) .................. 10-2016-0083471
Jul. 3, 2017 (KR) .................. 10-2017-0084093

(51) Int. Cl.
*H04N 19/167* (2014.01)
*H04N 13/161* (2018.01)
(Continued)

(52) U.S. Cl.
CPC ......... *H04N 19/167* (2014.11); *H04N 5/2624* (2013.01); *H04N 13/161* (2018.05);
(Continued)

(58) Field of Classification Search
CPC .................................................. H04N 19/167
(Continued)

(56) References Cited

U.S. PATENT DOCUMENTS 7,280,600 B2    10/2007   Orhand et al.
2002/0131507 A1   9/2002   Orhand et al.
(Continued)

FOREIGN PATENT DOCUMENTS

JP         4034092 B2      11/2007
KR     10-2006-0007765 A    1/2006
(Continued)

OTHER PUBLICATIONS

International Search Report for corresponding international application PCT/KR2017/007028 dated Oct. 25, 2017, citing the above references.

*Primary Examiner* — Eileen M Adams
*Assistant Examiner* — Daniel T Tekle
(74) *Attorney, Agent, or Firm* — Hauptman Ham, LLP

(57) ABSTRACT

A method and apparatus are disclosed for generating a video bitstream for high-resolution video streaming. The present disclosure in some embodiments provides a method and apparatus for generating a video bitstream by encoding a video at a different bit rate for each of video areas, in order to efficiently transmit a large amount of high-resolution video contents.

16 Claims, 21 Drawing Sheets

Low Quality Video (e.g., 5Mbps)

(a)

High Quality Video (e.g., 25 Mbps)

(b)

(51) Int. Cl.
*H04N 19/117* (2014.01)
*H04N 19/184* (2014.01)
*H04N 19/115* (2014.01)
*H04N 5/262* (2006.01)

(52) U.S. Cl.
CPC ......... *H04N 19/115* (2014.11); *H04N 19/117* (2014.11); *H04N 19/184* (2014.11)

(58) Field of Classification Search
USPC .......................................................... 348/43
See application file for complete search history.

(56) References Cited

U.S. PATENT DOCUMENTS

| | | | | |
|---|---|---|---|---|
| 2006/0017985 A1* | 1/2006 | Kim | ....................... | H04N 19/44 |
| | | | | 358/426.07 |
| 2014/0334551 A1* | 11/2014 | Kim | ..................... | H04N 19/196 |
| | | | | 375/240.16 |
| 2015/0172693 A1* | 6/2015 | Yang | .................... | H04N 19/167 |
| | | | | 375/240.26 |
| 2016/0255350 A1* | 9/2016 | Kang | ..................... | H04N 19/30 |
| | | | | 375/240.02 |
| 2017/0324945 A1* | 11/2017 | Cole | ................... | H04N 13/194 |

FOREIGN PATENT DOCUMENTS

| | | |
|---|---|---|
| KR | 10-2006-0015223 A | 2/2006 |
| KR | 10-2012-0059214 A | 6/2012 |
| WO | 2006/016782 A1 | 2/2006 |
| WO | 2015-056941 A1 | 4/2015 |

* cited by examiner

10 Mbps
(a)

12 Mbps
(b)

12 Mbps
(c)

16 Mbps
(d)

14 Mbps
(a)

12 Mbps
(b)

12 Mbps
(c)

9 Mbps
(d)

Low Quality Video (e.g., 5Mbps) — Independent
(a)

High Quality Video (e.g., 25 Mbps) — Independent
(b)

Low Quality Video (e.g., 5Mbps) — Nonindependent
(c)

High Quality Video (e.g., 25 Mbps) — Nonindependent
(d)

10 Mbps (a)

11 Mbps (b)

11 Mbps (c)

12 Mbps (d)

VIDEO BITSTREAM GENERATION METHOD AND DEVICE FOR HIGH-RESOLUTION VIDEO STREAMING

CROSS REFERENCE TO RELATED APPLICATION

The present application is a Continuation of U.S. application Ser. No. 16/313,623, filed on Dec. 27, 2018, which is the National Stage entry of PCT/KR2017/007028, filed on Jul. 3, 2017 which claims the priorities of Korean Patent Application No. 10-2016-0083471, filed on Jul. 1, 2016 and Patent Application No. 10-2017-0084093, filed on Jul. 3, 2017 in the KIPO (Korean Intellectual Property Office), the disclosures of which are incorporated herein in their entirety by reference.

TECHNICAL FIELD

The present disclosure in some embodiments relates to a method and apparatus for generating video bitstream by compressing video at a different bit rate for each of video areas in order to efficiently stream a large amount of high-resolution video contents.

BACKGROUND

The statements in this section merely provide background information related to the present disclosure and do not necessarily constitute prior art.

In the adaptive bit rate streaming (ABS) of the conventional video contents streaming technology, an encoder encodes and transmits the video contents so as to correspond to the bit rate requested for each service to a streaming server of contents delivery network (CDN). The streaming server prepares a plurality of encoded files with different qualities after encoding each video content at different bit rates in order to distribute the video contents as appropriate to user terminal apparatus and network environments.

The streaming server streams, at fixed time intervals, to the user terminal apparatus, the files of requested bit rates varying according to the variable user environment. For example, a user terminal apparatus can receive and reconstruct a suitable bitstream for a user environment in units of one second, from among a bitstream encoded at 2 Mbps in high-resolution (HD) class, a bitstream encoded at 1 Mbps in standard definition (SD) class, and a bitstream encoded at 0.5 Mbps in low definition (LD) class.

Contents requiring high video quality like virtual reality (VR) content, take up an enormous amount of data, and end up requiring a lot of hardware resources. Resorting to the conventional technology to stream these large amount of contents, when encoding the same contents by different qualities, results in further increased amount of data. This takes a very high-capacity storage space in the streaming server. Therefore, efficient streaming of a large amount of video contents necessitates a method of reducing the amount of data.

DISCLOSURE

Technical Problem

In order to efficiently transfer a large amount of high-definition video contents, the present disclosure in some embodiments seeks to provide a method and an apparatus for generating a video bitstream by encoding the video content with different video quality for each video area of the video content.

SUMMARY

According to some embodiments of the present disclosure, a video extraction and merge apparatus for high-resolution video streaming, includes an encoded data receiving unit and a video generation unit. The encoded data receiving unit is configured to receive a plurality of encoded bitstreams respectively encoded at different bit rates for an input video. The video generation unit is configured to classify a plurality of areas of the input video based on importance of the areas, to extract, for each of the plurality of areas, data corresponding to the area from an encoded video stream that is encoded at a bit rate corresponding to the importance of the area, and to merge the extracted data respectively corresponding to the plurality of areas, to generate a mixed video stream.

According to some embodiments of the present disclosure, a video streaming apparatus for high-resolution video streaming, includes a multichannel stream receiving unit, a bitstream selection unit and a terminal request receiving unit. The multichannel stream receiving unit is configured to receive a plurality of mixed video streams including encoded bitstreams that are respectively encoded at a different bit rate for each of the plurality of constituent areas of an input video depending on importance of the plurality of constituent areas. The bitstream selection unit is configured to obtain a high-importance position information of the inputvideo, to select a mixed video stream that matches the high-importance position information from among the plurality of mixed video streams, and transmit the selected mixed video stream. The terminal request receiving unit is configured to receive the high-importance position information from a user terminal apparatus.

According to some embodiments of the present disclosure, a method of generating a video bitstream for high-resolution video streaming, includes receiving a plurality of encoded bitstreams respectively encoded at different bit rates for an input video; classifying a plurality of areas of the input video based on importance of each of the areas; extracting, for each of plurality of areas, data corresponding to the area from an encoded bitstream that is encoded at a bit rates corresponding to the importance of the area among the plurality of encoded bitstreams; and merging the extracted encoded data respectively corresponding to the plurality of areas, to generate a mixed video stream.

According to some embodiments of the present disclosure, a method of generating a video bitstream for high-resolution video streaming, includes obtaining a plurality of mixed video streams including encoded bitstreams that are respectively encoded at a different bit rate for each of the plurality of constituent areas of an input video depending on importance of the plurality of constituent areas; obtaining a high-importance position information of the input video; and selecting a mixed video stream that matches the high-importance position information from among the plurality of mixed video streams, and transmitting the selected mixed video stream.

Advantageous Effects

As described above, the present disclosure in some embodiments provides a method and an apparatus for generating a video bitstream, which efficiently transfer a large amount of high-definition video contents by encoding each video with different video quality for each video area.

According to some embodiments of the present disclosure, ultra-high resolution, such as 4K ultra high-definition (4K UHD) and 8K UHD, video contents are transmitted based on the viewpoint of the user of a (for example, VR) user terminal apparatus with differentiated bit rates applied between the user's viewing area (within the field of view) and the user's non-viewing area (outside the visual field), and thereby saves the amount of data for the video area to be reproduced as the background, resulting in minimized buffering effect.

According to some embodiments of the present disclosure, when transmitting high-resolution private video contents such as VR contents, the video area corresponding to the user's field of view is quickly switched from a low-quality video to a high-quality video for provision following the user's viewing area (or viewpoint) as it changes.

According to some embodiments of the present disclosure, less amount of hardware resources is used for rendering the video contents, which effects a lower performance level (or less stringent specification) required for hardware for providing ultra-high-definition video contents such as VR contents.

DETAILED DESCRIPTION

Hereinafter, some embodiments of the present disclosure will be described in detail with reference to the accompanying drawings.

Throughout this specification, the terms such as "unit," "module," and the like refer to units for processing at least one function or operation, which may be implemented by hardware, software, or a combination of hardware and software.

Figure 1:
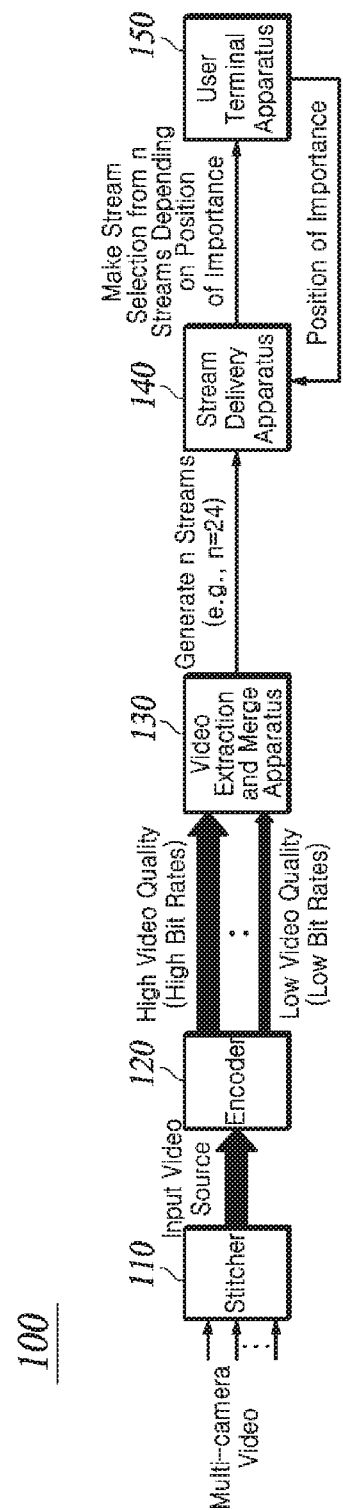
FIG. 1 is a schematic diagram of a configuration of a video bitstream generation system according to some embodiments of the present disclosure.

FIG. 1 is a schematic diagram of a configuration of a video bitstream generation system according to some embodiments of the present disclosure.

As shown in FIG. 1, a video bitstream generation system 100 according to some embodiments of the present disclosure includes a video stitcher 110, an encoder 120, a video extraction and merge apparatus 130, a stream delivery apparatus 140 and a user terminal apparatus 150. Although FIG. 1 illustrates that the video stitcher 110, the encoder 120, the video extraction and merge apparatus 130 and the stream delivery apparatus 140 exist as separate devices, the present disclosure is not limited thereto, and it can be implemented as a single integrated device including all of the respective functions or in the form of a plurality of some functions integrated into one.

The video stitcher 110 receives a plurality of videos outputted from a plurality of cameras, synchronizes and stitches the plurality of videos with each other into a picture, and transmits the stitched picture to the encoder 120.

The encoder 120 encodes one video source (i.e., picture), having been input stitched from the video stitcher 110, at different bit rates, and it generates a plurality of video streams having different bit rates. In other words, the encoder 120 can encode a stitched input picture at multiple bit rates (multiple video qualities) that encompass relatively high bit rates (high video quality) to relatively low bit rates (low video quality). Here, one video stream of the plurality of video streams is the encoded bitstream for the input video source that is encoded at one bit rate of the multiple bit rates including the relatively high bit rates through the relatively low bit rates. Hereinafter, the video stream generated by the encoder 120 is also referred to as encoded data.

The video extracting and merge device 130 operates, upon receiving different encoded bitstreams obtained from one video encoded at different bit rates from the encoder 120, to extract different encoded bitstreams corresponding to different areas in that one video, and to merge the extracted encoded bitstreams from the different areas, and thereby outputs a mixed video stream having different video qualities for different areas in such video. In addition, the video extraction and merge apparatus 130 obtains information on a plurality of areas of importance, and generates and outputs a plurality of mixed video streams having different video quality profiles by the position of the plurality of areas of importance.

The encoder 120 divides one input video source (i.e., video or picture) into a plurality of tiles or slices, or into a plurality of tiles and a plurality of slices for each tile, or into a plurality of slices and a plurality of tiles for each slice, and it processes the divisions in parallel. For example, the encoder 120 may encode a video source (video or picture) at relatively high bit rates (high video quality), one or more intermediate bit rates and relatively low bit rates, respectively, to generate a plurality of encoded bitstreams. This means three different bit rates as well as two different bit rates applicable to encoding one video source according to embodiments. With a plurality of encoded bitstreams generated by encoding one video source, the multiple encoded bitstreams generated are formed to have the same tile structure.

Here, the tile refers to a data process unit, a set of coding tree blocks (CTB) that are the maximum coding units, and it contains coding tree blocks of m blocks in the horizontal direction by n blocks in the vertical direction (provided that m and n are equal to or different from each other). The slice refers to a data process unit including at least one or more maximum coding units separated by a slice boundary. Tile and slice are composed of a plurality of coding tree blocks which are basic units of video compression.

Figure 2A:
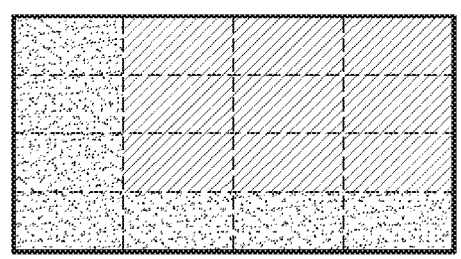
FIG. 2A is a diagram showing a case where a tile in a video or picture undergoes an inter prediction for which reference may be made to other tiles in the same picture.
Figure 2B:
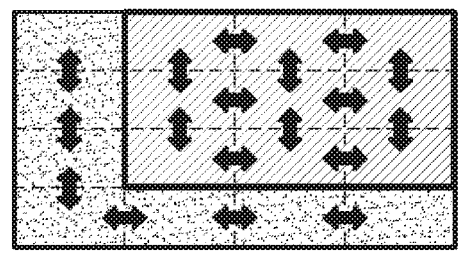
FIG. 2B is a diagram showing a case where a tile undergoes an inter prediction for which reference may be made exclusively to other tiles on the same picture within a specific area to which the same tile belongs.

FIG. 2A is a diagram showing a case where a tile in a picture undergoes an inter prediction for which reference may be made to tiles, in the reference picture, other than the collocated tile. FIG. 2B is a diagram showing a case where a tile undergoes an inter prediction for which reference may be made exclusively to other tiles within a specific area to which the collocated tile belongs in a reference picture.

In High Efficiency Video Coding (HEVC), a tile during inter prediction, may refer to other tiles than itself, i.e., the collocated tile, in the reference picture. However, for the purpose of merging and extracting specific areas in the video, a setting may be provided by the inter prediction reference picture 120 to disallow referring to tiles of any other region than the collocated tile during the inter prediction.

In the tile structure of the HEVC-encoded picture of FIG. 2a, the dotted lines define tolerant areas set to allow reference to be made between adjacent tiles, while in FIG. 2b, the solid lines indicate a boundary of an area set to disallow reference to be made between adjacent tiles against the tolerant areas set otherwise. The encoder 120 transmits additional information called supplemental enhancement information (SEI) along with the encoded data to the video extraction and merge apparatus 130, the SEI containing information on the tile structure within the encoded picture.

In addition, the video extracting and merge device 130 may revise and transmit the additional information on SEI for each mixed video stream unit encoded at each of the bit rates corresponding to each of the areas, to the stream delivery apparatus 140. To this end, the video extraction and merge apparatus 130 may generate or revise, and insert the additional information of SEI on the tile structure in the picture, along with the mixed video stream, into a bitstream. The additional information generated by the video extraction and merge apparatus 130 may include at least one of information on the number, positions and configurations of tiles sets contained in a display area (i.e., the area of importance) in the picture, wherein the configuration information may include the shape of the area of importance.

This can be expressed in syntax, as shown in Table 1. As shown in [Table 1], a relevant area of importance may be presented as a syntax including a tile index value (topleft_tile_idx) of a tile at the top leftmost position included in the tile set of the area of importance in the picture, and another tile index (bottomright_tile_idx) of a tile at the bottom rightmost position in the tile set.

TABLE 1 topleft_tile_idx
bottomright_tile_idx

In addition, when there are a plurality of areas of importance in a picture, or when an area of importance is composed of a plurality of tile sets, the relevant plurality of tile sets may be expressed by adding to the syntax information, the number of tile sets (num_tile_set_minus1), the identification of the respective ones (tile_set_id[i]) of the plurality of tile sets, and the position information for the identification of each of the respective tile sets (topleft_tile_idx[i], bottomright_tile_idx[i]), and the syntax expressing the plurality of tile sets is as shown in Table 2.

TABLE 2 num_tile_set_minus1
for( i = 0; i < num_merge_tile_minus1; i++ ) {
   tile_set_id[ i ]
   topleft_tile_idx[ i ]
   bottomright_tile_idx[ i ]
}

Figures 3, 4:
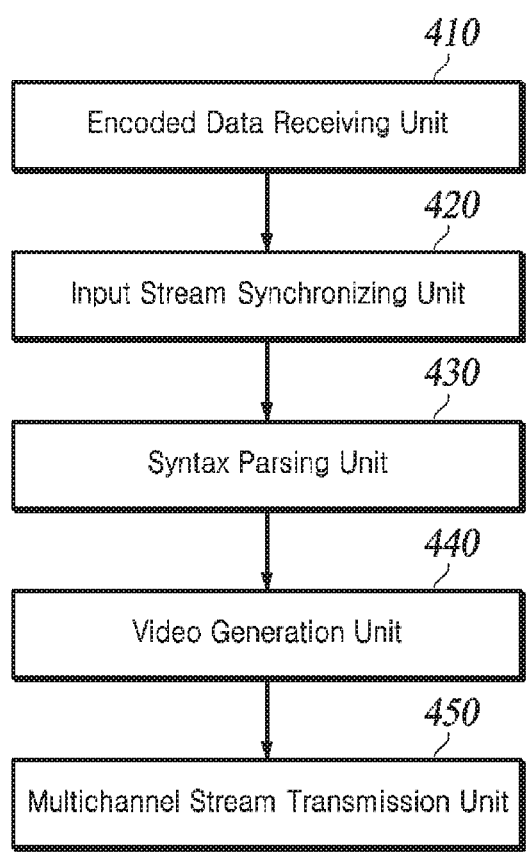
FIG. 3 is a diagram of a tile index and a display area in a tile set included in one picture.
FIG. 4 is a diagram of a configuration of a video extraction and merge apparatus according to some embodiments of the present disclosure.

FIG. 3 is a diagram of an index of each of a plurality of tiles and a display area included in one picture.

For example, when using the syntax of Table 2, and where one picture is set to include one tile set (tiles 5, 6, 9, 10) corresponding to an area of importance at such position and in such configuration as shown in FIG. 3, the num_tile_set_minus1 syntax, which is the syntax representing the number of tile sets, has a value of "0," the tile_set_id syntax indicating the identifier of that tile set is also "0," the topleft_tile_idx syntax corresponds to "5" indicating the index of the tile at the top leftmost position in the area of importance, and the bottomright_tile_idx syntax corresponds to "10" indicating the index of the tile at the bottom rightmost position in the area of importance.

More specifically, the tile structure is a rectangular structure including a plurality of coding tree blocks, and the slice structure is made up of a certain number of coding tree blocks grouped according to the encoding order of the coding tree blocks. Both the tiles and slices may used to split the input video in various formations, becomes data structures which may be used to perform HEVC encoding and decoding. Each tile structure is in a matrix form of CTBs (coding tree blocks). For example, one tile may be structured in the form of a 3×3 matrix or a 4×3 matrix of CTBs among other forms unlimited, and it goes without saying that the one tile structure may be CTB matrices of various sizes.

When encoding one input source at a plurality of video qualities from a high video quality to a low video quality, the encoder 120 performs setting in each of the plurality of video qualities of encoded data, to set the position of respective tiles and set the tile sizes for each of the tile positions to be equal to each other. Information on the size and position of the tile, that is, the structure related information of the tile, is recorded in the bitstream header information of the input video source. The structure related information items of the tile may include in a video parameter set (VPS), a sequence parameter set (SPS), a picture parameter set (PPS), or in their expanded data, or they may be included in the supplemental enhancement information (SEI). Some embodiments include the tile structure related information in the video utilization information data of the VPS (VPS_VUI).

For example, when all the tiles in a picture are divided into the same size for each of the horizontal axis and the vertical axis, the encoder 120 may record information on the number of tiles divided within the picture with respect to the horizontal axis and the vertical axis, in the tile related bitstream header information of the input video source. When the tiles are not divided into the same size with respect to each of the horizontal axis and the vertical axis, the need arises to add information on the number of tiles divided within the picture with respect to the horizontal axis and the vertical axis, and the tile sizes (widths and heights).

These examples may be carried out using the syntax of Table 3.

TABLE 3

| | |
|---|---|
| tiles_enabled_flag | u(1) |
| ... | |
| if( tiles_enabled_flag ) { | |
|     num_tile_columns_nninus1 | ue(v) |
|     num_tile_rows_minus1 | ue(v) |
|     uniform_spacing_flag | u(1) |
|     if( !uniform_spacing_flag ) { | |
|         for( i = 0; i < num_tile_columns_minus1; i++ ) | |
|             column_width_minus1[ i ] | ue(v) |
|         for( i = 0; i < num_tile_rows_minus1; i++ ) | |
|             row_height_minus1[ i ] | ue(v) |
|     } | |
| ... | |

Table 3 is a part of a syntax list showing some embodiments in which information on a tile structure is included in the bitstream header information of an input video source. Flag 'tiles_enabled_flag' is one indicating whether to use a tile, and it indicates whether or not the related picture includes a plurality of tiles. For example, when 'tiles_enabled_flag' is included at the PPS level, this flag can indicate whether each picture referring to the relevant PPS contains multiple tiles. When the value of "tiles_enabled_flag" is 1, each picture referring to the relevant PPS may contain multiple tiles. However, when the value of "tiles_enabled_flag" is 0, each picture referring to the relevant PPS may contain only one tile.

Flag 'num_tile_columns_minus1' is for indicating information on the number of columns of tiles existing in one picture and 'num_tile_rows_minus1' is information indicating information on the number of rows of tiles existing in one picture. Flags 'num_tile_columns_minus1' and 'num_tile_rows_minus1' indicate the number of rows and columns of tiles dividing a picture, respectively. For example, when 'tiles_structure_aligned_flag' is 1, these 'num_tile_columns_minus1' and 'num_tile_rows_minus1' may refer to 'num_tile_columns_minus1' and "num_tile_rows_minus1" of a direct reference layer, respectively, so that the referring flag values can be inferred to be equal to their referenced flag values.

Flag 'uniform_spacing_flag' is for indicating whether the spacing between the tile boundaries is uniform, and indicates whether the horizontal sizes and the vertical sizes of the tiles are uniform over the entire picture. This flag when valued 1, indicates even distribution of the horizontal and vertical sizes of the respective tiles in the picture. When its value is 0, this flag indicates nonuniform horizontal and vertical sizes of the tiles, where the width of the respective columns of tiles and the height of their respective rows may be directly signalled through 'width information of tile columns (column_width_minus1[i]) and 'height information of tile rows' (row_heignt_minus1[i]), respectively.

'column_width_minus1[i]' is the column width information of the tile, representing the width of the i-th column of tile, while 'row height minus1[i]' is the row height information of the tile, representing the height of the i-th row of tile. Here, the values of 'column_width_minus1[i]' and 'row_heignt_minus1[i]' may be expressed in CTU units.

For example, when 'tiles_structure_aligned_flag' is 1 and 'uniform_spacing_flag' is 0, 'column_width_minus1 [i]' and 'row_heignt_minus1 [i]' can be inferred from the information of the direct reference layer, respectively. That is, the current 'column_width_minus1[i]' may be obtained by scaling the value of 'column_width_minus1[i]' of the direct reference layer by the picture width ratio of the direct reference layer between the current layer. Similarly, the current 'row_heignt_minus1[i]' may be obtained by scaling the value of 'row_heignt_minus1[i]' of the direct reference layer by the picture height ratio of the direct reference layer between the current layer.

The encoder 120 encodes a picture by using a tile structure or a slice structure, or using a structure obtained by mixing a tile and a slice according to some embodiments. Just for the sake of convenience of explanation, the following description illustrates encoding pictures by using a tile structure.

When dividing one input video source into a plurality of tiles for encoding, the encoder 120 may decide whether to encode each of a plurality of tiles independently, or to encode while allowing tiles to have a correlation between them.

Here, independently encoding means that no correlation exists between different tiles at the time of predictive encoding and filtering (de-blocking filter). In other words, when the tiles in the picture are encoded independently, performing an intra prediction involves no reference made to another neighboring tile in the same picture, and performing an inter prediction, which is supposed to refer to a reference picture, takes a setting to refer to just a tile colocated with the current tile but no other tiles. In this case, once the tiles are encoded and then completely reconstructed, no filtering is performed between other tiles at the tile boundaries.

In order to encode the respective tiles independently, the encoder 120 may not refer to adjacent neighboring tiles in the reference picture during inter prediction of the respective tiles. In this case, encoding proceeds after disabling the filtering function of the tile boundary area. For example, high-bit rate encoded data and low-bit rate encoded data may be encoded with the inter prediction set to be performed for each of all tiles by not referring to other tiles besides self-referencing, that is, setting the respective tiles as independent tiles.

The encoder 120 may also use the input video to generate independent tile-type high-bit rate encoded data and non-independent tile-type high-bit rate encoded data, respectively.

The independent tile-type high-bit rate encoded data is obtained encoded at the time of inter prediction of all the tiles (that is, independent tiles) in the encoded data with a setting so as not to refer to the surrounding tiles. The condition of not referring to the surrounding tiles here means nonreferring to other tiles besides self-referencing each tile in itself.

The non-independent tile-type high-bit rate encoded data is obtained encoded at the time of inter prediction of the blocks included in all the respective encoded and generated tiles (i.e., non-independent tiles) while allowing to refer to at least one of pixel data of other tiles and the encoded information of the other tiles in a reference picture.

Some following description that reference can be made between tiles connotes that reference can also be made to information on other tiles besides the tiles colocated in the reference picture with the tiles in the current picture. To the contrary, that no reference can be made between tiles connotes that reference cannot be made to information on another tile than the tiles colocated in the reference picture with the tiles in the current picture.

Or else, tiles can refer to each other within a tile set corresponding to a specific area expressed by the same video quality, and tiles in a specific area may be encoded while being prohibited from referring to a tile set corresponding to an outside portion of the specific area. In addition, the function of filtering the tile boundary area may be enabled or disabled by the video source header information (PPS) and slice header information. Information in the header of the video source, indicating the valid or invalid state of the filtering function, may be specified for each tile and slice.

For this purpose, for example, 'loop_filter_across_tiles_enabled_flag' and 'pps_loop_filter_across_slices_enabled_flag' may be used in the header information of the video source, and such syntax as slice_loop_filter_across_slices_enabled_flag shown in Table 4 for example, may be used in the slice header information, as information for indicating the enablement state of the filtering function between slices.

TABLE 4

| |
|---|
| if( pps_loop_filter_across_slices_enabled_flag &&( |
| slice_sao_luma_flag \|\| slice_sao _chroma_flag |
| \|\| !slice_deblocking_filter_disabled_flag ) ) |
| slice_loop_filter_across_slices_enabled_flag            u(1) |

Flag 'loop_filter_across_tiles_enabled_flag' is for indicating whether or not to apply loop filtering between tiles, and thereby indicating whether in-loop filtering may be performed traversing the tile boundary in the relevant picture. An in-loop filter is applicable to the reconstructed picture, and it is used to generate an output to a video reconstruction apparatus or a picture to be inserted in a decoded picture buffer.

For example, when 'loop_filter_across_tiles_enabled_flag' is included at the PPS level, it can indicate whether in-loop filtering may be performed across a tile boundary in a picture referencing that PPS. When this flag is valued 1, in-loop filtering may be performed across the tile boundary in the picture referencing that PPS. However, when the flag value is 0, no in-loop filtering is performed across the tile boundary in the picture referencing that PPS.

Flag 'slice_loop_filter_across_slices_enabled_flag' is for indicating whether in-loop filtering may be performed across the left boundary and the upper boundary of the current slice. If the flag value is 1, in-loop filtering may be performed across the left boundary and the upper boundary of the current slice, respectively. However, when the flag value is 0, no in-loop filtering may be performed across the left boundary and the upper boundary of the current slice. The absence of 'slice_loop_filter_across_slices_enabled_flag' in the bitstream is presumed to be the same as 'pps_loop_filter_across_slices_enabled_flag'.

The encoder 120 can encode input sources at a plurality of predetermined bit rates (video qualities), respectively, to generate as many streams as the predetermined bit rates. At this time, the video quality is determined by the value of quantization parameter (Qp) which is a parameter used in the process of quantization. In order to encode at high bit rate, a low Qp value (e.g., Qp=12) is set. To encode at low bit rate, a high Qp value (e.g., Qp=25) is set.

The Qp value may be set for each video unit of various sizes, including a video source (picture), a slice, a coding unit (CU), etc. In other words, different Qp values may be used for encoding for each video source, or different Qp values may be used for encoding for each slice, and so on.

For example, when setting the initial Qp value in the bitstream header of the video source and changing the Qp value of the slice using the bitstream header of the set video source, the difference value of the Qp value to change from the initial Qp value, which is slice Qp delta value, may be designated in units of slices. In addition, to change the Qp value for each coding unit, the cu Qp delta value, the difference value of the Qp value to change from the initial Qp value may be designated for each coding unit. For example, when setting the initial Qp value to 26 in the video source bitstream header and setting the slice Qp delta value of the slice using the set video source bitstream header to +2, the Qp value of the slice finally becomes 28.

For the encoder 120 to set the Qp value on a slice-by-slice basis and encode the input video source at a plurality of bit rates, the encoder 120 may set the picture structure so that the tile and the slice are the same, and adjust the slice Qp delta value of slice header information corresponding to each tile in the picture, whereby encoding the input video source at a plurality of bit rates.

For example, when the initial Qp value is set to 26 in the video source bitstream header, to encode the video source at a high bit rate, setting the slice Qp delta value of the slice to −10 may give the final Qp value of 16 for encoding the tile at a high bit rate. To encode the video source at a low bit rate, it can be achieved by setting the slice Qp delta value of the slice to +10 with the final Qp value becoming 36. In addition, this way of adjusting the video quality of encoded data by generating high-bit rate encoded data or generating low-bit rate encoded data can also be achieved in units of coding units.

The encoder 120 may record the initial Qp value of the video source to the video source header information, the slice Qp delta value of the slice to the slice header information, the cu Qp delta value of the coding unit to the coding unit header information.

Some embodiments include the syntax (init_qp_minus26) indicating the initial Qp value at the picture level in the video source header information, include, in the slice header information, the syntax (slice_qp_delta) indicating the difference value between 'init_qp_minus26' and the initial Qp value at the slice level, and include, in the coding unit header information, the size information (cu_qp_delta_abs) and sign information (cu_qp_delta_sign) of the syntax (cu_qp_delta) indicating the difference value between the Qp value and the predicted Qp value at the coding unit level. The Qp-related syntaxes added to the coding unit header information according to some embodiments are as shown in Table 5.

TABLE 5

| if( cu_qp_delta_enabled_flag && !IsCuQpDeltaCoded ) { | |
|---|---|
| cu_qp_delta_abs | ae(v) |
| if( cu_qp_delta_abs ) | |
| cu_qp_delta_sign_flag | ae(v) |
| } | |

The encoded data may be stored in a separate dedicated storage (not shown), or it may be immediately transmitted to the video extraction and merge apparatus 130.

The video extracting and merge device 130 according to some embodiments of the present disclosure refer to a user terminal apparatus including a personal computer (PC), a laptop computer, a tablet computer, a personal digital assistant (PDA), a game console, a portable multimedia player (PMP), a PlayStation Portable (PSP), a wireless communication terminal, a smartphone, a TV, a media player, and the like. The video extraction and merge apparatus 130 according to some embodiments may be a server terminal apparatus such as an application server and a service server.

The video extracting and merging apparatus 130 according to some embodiments of the present disclosure refers to various apparatuses each including: (i) a communication apparatus such as a communication modem and the like for performing communications with various types of devices or a wired/wireless communication networks, (ii) a memory for storing various programs and data for encoding or decoding a video, or for inter or intra prediction for the encoding or decoding, and (iii) various devices installed with a microprocessor for executing a program so as to perform calculation and controlling, and the like. According to at least one embodiment, the memory includes a computer-readable recording/storage medium such as a random access memory (RAM), a read only memory (ROM), a flash memory, an optical disk, a magnetic disk, a solid-state disk, and the like. According to at least one embodiment, the microprocessor is programmed for performing one or more of operations and/or functions described herein. According to at least one embodiment, the microprocessor is implemented, in whole or in part, by hardware specifically configured (one or more application specific integrated circuits or ASICs).

The video extracting and merge device 130 generates and outputs a mixed video stream by using a plurality of encoded bitstreams (e.g., high-bit rate encoded data and low-bit rate encoded data) received from a storage (not shown) or the encoder 120, and high-importance position information obtained from an external device (e.g., a user terminal apparatus) or predetermined high-importance position information. Specifically, based on high-importance position information, an area corresponding to the position of importance in a picture is extracted from high-bit rate encoded data, a area other than the position of importance is extracted from low-bit rate encoded data, and encoded bitstreams at the bit rate corresponding to the respective extracted areas are merged, whereby generating a mixed video stream corresponding to one high-importance position information. The generated mixed video stream may be transmitted to the stream delivery apparatus 140 which may be implemented as a video streaming server. A concrete description of the mixed video stream according to some embodiments will be described below with reference to other drawings.

Possible methods for the stream delivery apparatus 140 to perform streaming one mixed video stream are a push method and a pull method.

For example, in the push method, the stream delivery apparatus 140 may select a corresponding mixed video stream to the position of the viewpoint of the user and transmit the selected mixed video stream to the user terminal apparatus 150.

The pull method may be represented by Dynamic Adaptive Streaming over HTTP (DASH) in which the stream delivery apparatus 140 when transmitting the mixed video stream, defines and transmits a multimedia presentation description (MPD) to the user terminal apparatus 150 which may then perform adaptive streaming based on the MPD in receipt according to the network environment and the specifications of the terminal apparatus.

The multimedia presentation description information is the manifest file that includes providable content, bit rate information of the content and substitutable bit rate information, and information such as URL addresses of that content, and it uses a profile information which makes different definitions for one content depending on the resolution and the bit rate for providing appropriate QoS in accord with the terminal, network environment, etc., for defining the url of the video for each relevant profile.

A video player in the user terminal apparatus 150 may select and play one of the profiles defined by Representation in accord with the terminal specifications and the network environment. Examples of MPD used in this manner are as follows.

```
<?xml version="1.0" encoding="UTF-8"?>
<MPD xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:211"
  profiles="urn:mpeg:dash:profile:isoff-main: 2011"
  type="static"
  mediaPresentationDuration="PT0H9M56.46S"
  minBufferTime="PT15.0S">
  <BaseURL>http://www.test.com/bunny_15s/</BaseURL>
  <Period start="PT0S">
  <AdaptationSet bitstreamSwitching="true">
    Representation id="0" codecs="avc1"mimeType="video/mp4" width="320" height="240" startWithSAP="1" bandwidth="45351">
    <SegmentBase>
    <Initialization sourceURL="bunny_15s_50kbit/bunny_50kbit_dash.mp4"/>
    </SegmentBase>
    <SegmentList duration="15">
    <SegmentURL media="bunny_15s_50kbit/bunny_15s1.m4s"/>
    <SegmentURL media="bunny_15s_50kbit/bunny_15s2.m4s"/>
    <! - ... ->
```

-continued

```
      <SegmentURL media="bunny_15s_50kbit/bunny_15s39.m/4s"/>
      <SegmentURL media="bunny_15s_50kbit/bunny_15s40.m4s"/>
    </SegmentList>
  </Representation>
  Representation id="1" codecs="avc1" mimeType="video/mp 4"
width="320" height="240" startWithSAP="1" bandwidth="88563">
    <SegmentBase>
      <Initialization
sourceURL="bunny_15s_100kbit/bunny_100kbit_dash.mp4"/>
    </SegmentBase>
    <SegmentList duration="15">
      <SegmentURL media="bunny_15s_100kbit/bunny_15s1.m4s"/>
      <SegmentURL media="bunny_15s_100kbit/bunny_15s2.m4s"/>
<! - ... ->
      <SegmentURL media="bunny_15s_100kbit/bunny_15s39.m4s"/>
      <SegmentURL media="bunny_15s_100kbit/bunny_15s40.m4s"/>
    </SegmentList>
  </Representation>
<! - ... ->
  </AdaptationSet>
</Period>
</MPD>
```

The stream delivery apparatus 140 determines an area of importance in accord with the user's viewpoint position. When transmitting a mixed video stream with a high-bit rate area and a low-bit rate area to the user terminal unit 150 in a pull method, the stream delivery apparatus 140 may add the view value and the identification of Representation to the Viewpoint element (information on the position) of AdaptationSet (descriptive information on the transferable file) supported by DASH standard, and thereby make a definition for a mixed video stream to be switchable for colocating high-bit rate data as a viewer's viewing position changes, with the changed corresponding position.

```
  <AdaptationSet mimeType="video/mp4" codecs="avc1.640828">
    <Viewpoint schemeIdUri="urn:mpeg:dash:mvv:2014" value="0"/>
    <Role schemeIdUri="urn:mpeg:dash:v+d:2014" value="t"/>
    Representation bandwidth="128000" avgPSNR="34.1"
avgSSIM="0.959">
    <SegmentList duration="1">
      <Initialization sourceURL="oblivion_128_t0_init.mp4"/>
      <SegmentURL media="oblivion_128_t0_seg1.m4s"/>
    </SegmentList>
  </Representation>
  </AdaptationSet>
```

In order to provide the pull method, the stream delivery apparatus 140 may prepare in advance a plurality of mixed video streams necessary for adaptively streaming in accord with the user's viewpoint position, and transmit a mixed video stream to the user terminal apparatus 150 which then hands over area request information (i.e., the information indicating the area of importance) for the area to view to the stream delivery apparatus 140 based on the viewpoint information, so that it can receive a mixed video stream in which the requested area has been extracted/merged at a high bit rate. Here, the area request information for the area to view is information for receiving the stream in which the requested area has been extracted/merged at a high bit rate, and that information may refer to one including the tile identification for indicating the tile position in a picture, the coordinate value of the viewing/listening focus, and the like.

The video extraction and merge apparatus 130 according some embodiments may be implemented in a separate server (e.g., the stream delivery apparatus 140) or the user terminal apparatus 150.

When implemented in a separate server, the video extracting and merge device 130 may be located in front of the stream delivery apparatus 140, where the video extracting and merge device 130 transmits a plurality of mixed video streams that have undergone extracting and merging for each viewing position (i.e., position of importance) to the stream delivery apparatus 140 which, responsive to the viewing position transmitted by the user terminal apparatus 150, selects and transmits the mixed video stream that is in accord with the user's requested viewing position.

When implemented in the user terminal apparatus 150, the video extraction and merge apparatus 130 may receive all of the plurality of encoded bitstreams from the encoder 120 to extract and combine the videos therefrom.

High-importance position information, which is to be considered for efficient encoding of high-resolution videos, is information for reflecting human visual characteristics. Generally, a user who views a high-resolution video focuses on a specific area within a limited range in the video rather than viewing the whole video. Therefore, when processing a high-resolution video with an enormous amount of data, it is better not to encode the entire video at a high bit rate, but to encode only the area where the user's viewpoint remains and encode the remaining area at a low bit rate, and thereby reduce data throughput for streaming the high-resolution video.

The high-importance position information may mean, for example, information on the user's viewpoint position. Considering the fact that the user's viewpoint mostly faces an object that is in the input video, information on the position of the object can also be high-importance position information.

Hereinafter, with reference to FIG. 4, the video extraction and merge apparatus 130 according to some embodiments of the present disclosure will be specifically described.

FIG. 4 is a diagram of a configuration of a video extraction and merge apparatus according to some embodiments of the present disclosure. As shown in FIG. 4, a video extraction and merge apparatus 130 according to some embodiments includes an encoded data receiving unit 410, an input stream synchronizing unit 420, a syntax parsing unit 430, a video generation unit 440 and a multichannel stream transmission unit 450. In FIG. 4, the respective components are presented separately, although they are not so limited, and may be implemented by a processor that includes all of the respective functions.

The encoded data receiving unit 410 receives a plurality of encoded bitstreams in which an input video source is encoded at different bit rates. For example, the encoded data receiving unit 410 may receive encoded data of one video source encoded at a low video quality, that is, at a low bit rate (e.g., 5 Mbps), and encoded data of the same video source encoded at a high video quality, that is, at a high bit rate (e.g., 25 Mbps), respectively.

Figure 5:
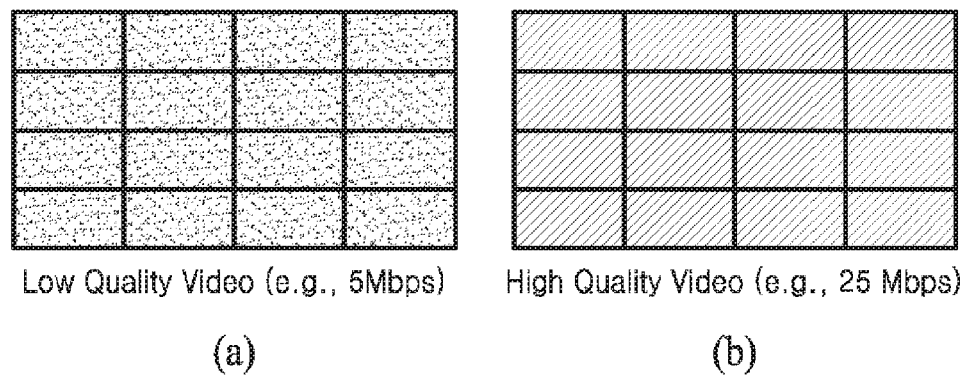
FIG. 5 is a diagram of case (a) and case (b) where all tiles in a video are encoded independently without referring to adjacent tiles in order to extract and merge the tiles based on information on a position of importance or high-importance position information.

FIG. 5 shows conceptual diagrams (a) and (b) of encoded data of an input video source according to some embodiments of the present disclosure.

The encoded data according to some embodiments of the present disclosure may be composed of a plurality of tiles or slices. FIG. 5 illustrates at (a) and (b) encoded data obtained by dividing one input source into 16 tiles and encoding them at 5 Mbps and 25 Mbps, respectively. The shape of a plurality of rectangles constituting each encoded data means each tile. Although the sizes of a plurality of tiles are shown to be equal to each other, they are not so limited, and different sizes of respective tiles may be included in some cases, which is equally applicable to cases of FIGS. 6 (a) to 12 (d).

FIG. 5 at (a) and (b) shows cases for extracting and merging tiles freely based on high-importance position information by encoding all the tiles in the video independently without referring to adjacent tiles, wherein the first one at (a) illustrates low-bit rate encoded data, and the second one at (b) high-bit rate encoded data.

Different from (a) and (b) cases of FIG. 5, some embodiments encodes one input video source at three or more bit rates, respectively (e.g., low video quality, one or more general video qualities and high Video quality, etc.). For the sake of clarity, however, the following will describe an example case where the input video source is encoded at two bit rates (5 Mbps and 25 Mbps) of low video quality and high video quality.

To start extracting and merging of the encoded data from the same temporal position on the video sequence, the input stream synchronization unit 420 finds the I frame of each encoded bitstream and synchronizes between the frame input sequences of the individual encoded bitstream, and thereby prevents the contents from being incoherent in the video sequence between encoded bitstreams.

The syntax parsing unit 430 is capable of parsing, from the encoded stream, the tile structure and the number of tiles in the picture, the size of the tile, identification between independent tiles and non-independent tiles, etc. The parsed information provides informed determination of the shape, size, etc. of the area of importance, to extract streams of multiple bit rates and merge them in various forms. For example, the shape and size of an area, which is to be extracted as the area of importance in the video, may be determined depending on the structure, the number and size of the tiles, wherein the shape of the area to be extracted as the area of importance may be rectangular, rhomboid, or other various forms that may be composed of tile sets. In addition, the number of areas of importance to be extracted and the sizes of the respective areas of importance may be determined depending on the transmission bit rate usable from the network by the user terminal apparatus 150, and the position of importance in the video. Further, with a 360° VR video which has less importance of viewing in its top (ceiling) and bottom (floor) portions, their corresponding areas may also be defined as non-independent tiles rather than independent tiles.

The video generation unit 440 is adapted to classify a plurality of areas of the input video as received by their importance, to extract, for each of a plurality of areas, from among a plurality of encoded bitstreams and more particularly from such encoded bitstreams as having different bit rates corresponding to the importance of the relevant respective areas, data of the relevant areas, and to generate a mixed video stream by merging the encoded bitstreams respectively extracted corresponding with the plurality of areas.

The video generation unit 440 generates a plurality of mixed video streams having various combinations of tile data, based on the position of the area of importance, which is determined according to the importance.

The video generation unit 440 sets the highest-importance area from the input video source, and classifies the input video source into a plurality of areas by degree of importance. Here, an area of importance means an area to be extracted from encoded data being encoded at the highest bit rate. The degree of importance may be determined from the above-described high-importance position information, and the importance degree may be set to be higher as the area resides closer to the user's viewpoint position in one input video source, or to the object position in the input video source.

Further, the video area may be divided into a position where frequent viewing occurs (corresponding to the area of importance) and a position where viewing is infrequent. Specifically, the video generation unit 440 may obtain the user's viewpoint position of the input video source from the user terminal apparatus 150, to set one or more areas included within a certain range from the user's viewpoint position as areas of importance, and to have a plurality of areas classified based on the distance from the user's viewpoint position.

When setting the areas of importance based on the user's viewpoint position, the video generation unit 440 may periodically obtain and compare the user's viewpoint position from the user terminal apparatus 150 with the previously obtained viewpoint position to confirm whether or not the newly obtained viewpoint position has been moved from the previously obtained viewpoint position, and if it has, it can newly set the area of importance reflecting the movement.

Further, the video generation unit 440 may periodically obtain the user's viewpoint position to extract and transmit only the high-quality video area corresponding to the viewpoint position in accordance with the performance of the decoder of the user terminal unit 150 without merging it with the video quality of other areas.

For example, in the field of VR videos, a 2D video is converted into a 3D spherical version before it is projected. In case of the VR video generated at the original resolution of 2160p, considering incapable terminals with regard to decoding 2160p VR videos, only the 1080p area that is set as an area of importance may be extracted from the high-bit rate encoded stream before it is transmitted.

In such a case, the user terminal apparatus 150 may perform VR rendering in accordance with the resolution (2160p) of the original video, while still reconstructing only the transmitted partial area (1080p) by projection. For this purpose, the stream delivery apparatus 140 may additionally provide resolution information of a partial area, when the user terminal apparatus 150 is delivered with the flag indicating whether the video to be reconstructed is the whole area or a partial area, the resolution corresponding to the whole area of the player on the terminal, and video data corresponding to that partial area.

In addition, the video generation unit 440 may obtain one or more object positions from the video, set one or more areas included within a certain distance range from the one or more object positions as areas of importance, and classify multiple areas within a picture based on the distance from the one or more object positions. Here, the object positions may be obtained by an object detection and tracking/viewer's eye tracking algorithm as implemented in the video extraction and merge apparatus 130 or the user terminal apparatus 150 according to some embodiments of the present disclosure, or they may be obtained from an external device (not shown) which detected the object.

When performing the object position-based setting of an area of importance, considering possibly multiple objects being included in the input video source, multiple areas of importance may also be set.

In setting the area of importance in the input video source, there are further points to be considered in addition to the user's viewpoint position and the object position, depending on the characteristics of the input video source. For example, when the input video source is a 360° video, depending on which part of the video the area of importance is located at, different areas may need to be further set as the areas of importance, or a preset area of importance may need to be reduced.

More specifically, a 360° video has a feature that when in playback, both ends of the video may be seen to be in contact with each other. In other words, one may see that the upper opposite ends of the video touch each other, or that the lower opposite ends of the video touch each other. This is because the video is distorted or warped in the process of stitching which combines the videos captured by multiple cameras.

Therefore, the video generation unit 440, when the area set as the area of importance includes one upper edge area of the input video source, may also set the other upper edge area of the input video source as the area of importance, and when the area set as the area of importance includes one lower edge area of the input video source, it may also set the other lower edge area of the input video source as the area of importance.

The aforementioned stitching process causes the distortion (warping) of a 360° video to occur in the upper areas and the lower areas of a video rather than in the center part of the video, and information redundancy occurs in the upper areas and the lower areas of the video. In general, the upper and lower areas of a 360° video generally present the sky and the ground, respectively, which explains the higher importance of a video being often present in its central area than its upper and lower areas.

Accordingly, the video generation unit 440, when an area of the highest importance includes a top area or a bottom area (the area corresponding to the top tiles or the area corresponding to the bottom tiles) of the input video source, may exclude the corresponding uppermost area or the lowermost area from being the area of importance, and set the remaining area having the highest importance as the area of importance.

The number of tiles belonging respectively to the plurality of areas classified by the video generation unit 440 may differ according to the size of the tile and the position of the area of importance. In other words, in an area which is set as an area of importance and is extracted from the high-quality video, the number of the included tiles is variable.

The video generation unit 440 may extract a plurality of areas respectively from among a plurality of encoded data, and more particularly from different encoded bitstreams each having a bit rate corresponding to the importance of each of the plurality of areas, merge the extracted areas, to generate a mixed video stream corresponding to the input video source, wherein the mixed video stream thus generated corresponds to one importance profile.

The video generation unit 440 may include, in the bitstream header information of the input video source to be divided into a plurality of data process units (i.e., tiles and slices) for encoding operation, the size and position information of the data process unit, the initial Qp value, and information on whether to apply filtering between multiple data process units. Further, it may include, in the bitstream header information of the data process unit, the Qp value corresponding to the importance of the area including the data process unit among the plurality of areas of the input video source.

The structure of the encoded data corresponding to the input video source according to the at least one embodiment is configured to include, in this sequence: bitstream header information of the input video source, header information of the tile and encoded data information, and it is configured to include header information of all the tiles in the video source and information on the encoded video source in consecutive order following the raster scan sequence.

Here, the bitstream header of the input video source may include information on the size and position of the tile, initial Qp value and information on valid/invalid filtering. Each tile is encoded according to its corresponding importance level, and the header of each tile includes information (i.e., Qp delta value) commensurate with the corresponding importance level, and the encoded data includes information encoded according to the corresponding importance level. When referring to the header information already transmitted, the bitstream header information of the input video source may be omitted.

Specifically, the video generation unit 440 may extract the area of importance among the plurality of areas, from the highest-bit rate encoded data among the plurality of encoded bitstreams, and extract the area of lesser importance among the plurality of areas, from the lower-bit rate encoded data.

Considering that an area of importance can move in real time, the video generation unit 440 may extracts up to the adjacent area to the area of importance from the highest-bit rate encoded data among the plurality of encoded bitstreams.

Figure 6:
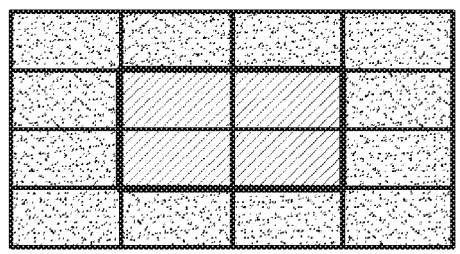
FIG. 6 is conceptual diagrams (a) to (d) of a video bitstream structured according to some embodiments of the present disclosure, based on the encoded data of FIG. 5 at (a) and (b).
Figure 6:
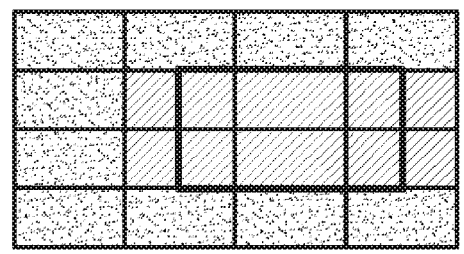
Figure 6:
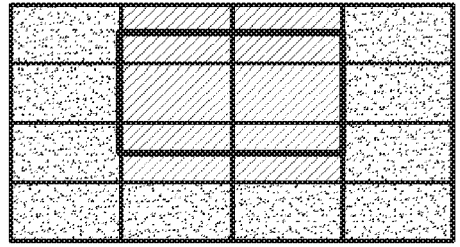
Figure 6:
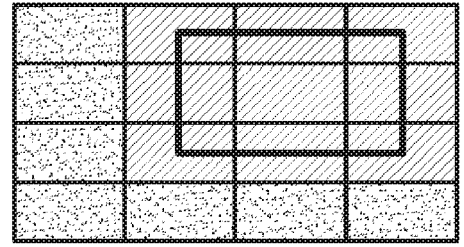

FIG. 6 is conceptual diagrams (a) to (d) of a mixed video bitstream structured according to some embodiments of the present disclosure, based on the encoded data of FIG. 5 at (a) and (b).

As shown in FIG. 6 from (a) to (d), the video generation unit 440 may generate a mixed video stream, corresponding to the input video source, to be structured with a low-bit rate (e.g., 5 Mbps) area and a high-bit rate (e.g., 25 Mbps) area merged and encoded according to information on the area of importance of the video.

The average encoding rates of the whole video according to the tile structures shown in FIG. 6 from (a) to (d) may be calculated to be 10 Mbps, 12 Mbps, 12 Mbps and 16 Mbps, respectively. This can provide an estimated decrease in bit rate by about 50% as compared with the case of encoding all the tiles in the video at a bit rate of 25 Mbps.

Rectangles indicated by bold lines in FIG. 6 from (a) to (d) represent the positions of importance in the video. Here, the position of importance is the position of the area of high importance like the user's viewpoint position and the object position detected from the input video source. This equally applies to FIG. 7 from (a) through FIG. 12 to (d).

When the boundary of the position of importance coincides with the boundary of the tiles as shown in (a) of FIG. 6, the tiles included in the position of importance may be set as the area of importance. When the boundary of the position of importance is partially non-coincident with the boundary of the tiles as shown in FIG. 6 from (b) to (c), all those tiles included even partially in the position of importance may be set as the areas of importance.

The tiles constituting the area of importance may be extracted from the high-bit rated encoded data as shown in FIG. 5 at (b), and the tiles constituting the areas other than the areas of importance may be extracted from the low-bit rated encoded data as shown in FIG. 5 at (a), so that the classified extracted tiles are finally merged into one mixed video bitstream. Some embodiments provide a mixed video stream structured with tiles of encoded data having three or more different bit rates.

Figure 7:
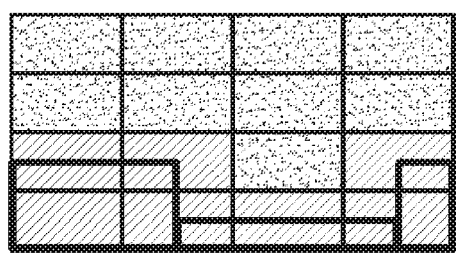
FIG. 7 is conceptual diagrams (a) to (d) of a video bitstream structured according to another embodiment of the present disclosure, based on the encoded data of FIG. 5 at (a) and (b).
Figure 7:
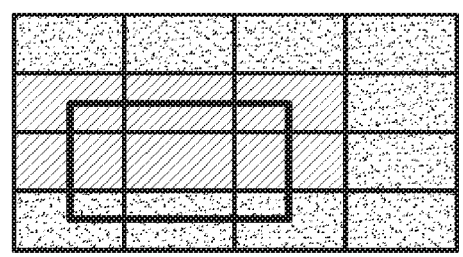
Figure 7:
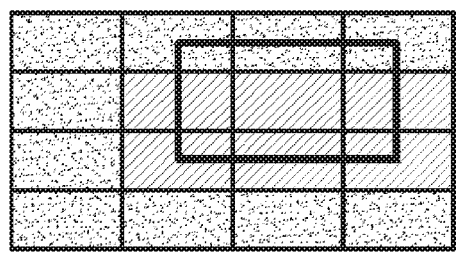
Figure 7:
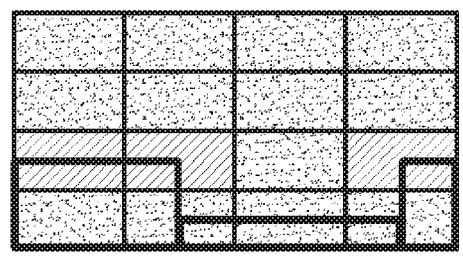

FIG. 7 is conceptual diagrams (a) to (d) of a mixed video bitstream structured according to another embodiment of the present disclosure, based on the encoded data of FIG. 5 at (a) and (b).

Specifically, FIG. 7 from (a) to (d) show the structure of a mixed video stream generated on the basis of the area of importance set in consideration of the above-mentioned feature of the 360° video. The average encoding rates of the whole video by the tile structures shown in FIG. 7 from (a) to (d) are 14 Mbps, 12 Mbps, 12 Mbps and 9 Mbps, respectively. As in the case of FIGS. 6 (a) and (b), the structure of FIG. 7 from (a) to (d) can provide an estimated decrease in bit rate by about 50% as compared with the case of encoding all the tiles at a bit rate of 25 Mbps.

FIG. 7 (a) shows a case where an area of importance includes one lowermost edge area of the video, when the other lowermost edge area is also set as an area of importance. This is to take into consideration that 360° video is susceptible to distortion (warping) in the process of stitching.

FIG. 7 at (b) and (c) shows that the possible redundancy of information due to stitching in the upper area and the lower area of the 360° video is addressed by excluding the tiles residing in the top row and the bottom row of the video from being the areas of importance, in spite of their occupied positions of importance.

FIG. 7 (d) shows a case where all the tile composition methods applied respectively to the applications of FIG. 7 from (a) to (c), illustrating the same video as FIG. 7 (a) with the tiles existing in the lowermost row being excluded from being the areas of importance.

Figure 8:
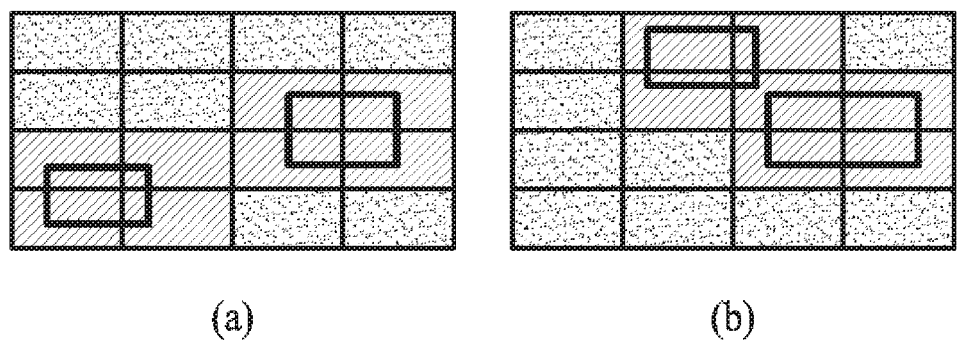
FIG. 8 is a diagram of case (a) and case (b) of setting areas of importance by using one or more object positions detected from an input video source with the number of areas of importance set being dependent on that of the objects detected.

FIG. 8 is conceptual diagrams (a) and (b) of a mixed video bitstream structured according to yet another embodiment of the present disclosure, based on the encoded data of FIG. 5 at (a) and (b).

Specifically, FIG. 8 is a diagram of (a) case and (b) case of setting areas of importance by using one or more object positions detected from an input video. As described above, the number of areas of importance set may be dependent on that of the objects detected.

Figure 9:
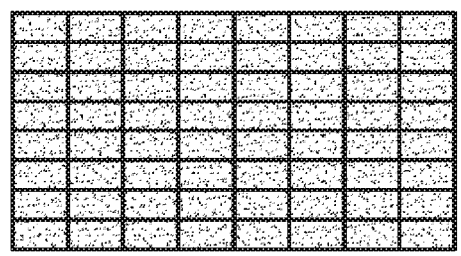
FIG. 9 is conceptual diagrams (a) to (d) of encoded data of an input video source according to another embodiment of the present disclosure.
Figure 9:
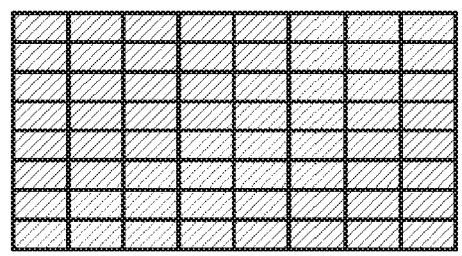
Figure 9:
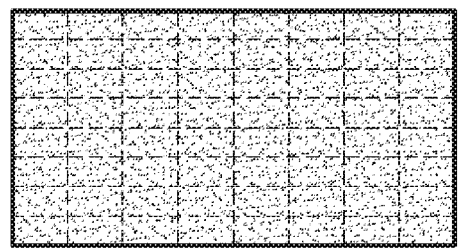
Figure 9:
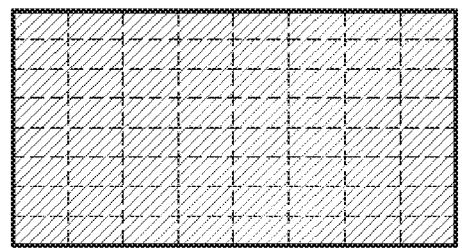

FIG. 9 shows conceptual diagrams (a) to (d) of encoded data of an input video source according to yet another embodiment of the present disclosure.

As shown in FIG. 9, there is a plurality of encoded bitstreams generable by the encoder 120, which includes a first encoded data group (e.g., (c) and (d) in FIG. 9) composed of bitstreams encoded by referring to information on tiles or slices adjacent to each other, and a second encoded data group (e.g., (a) and (b) in FIG. 9) composed of bitstreams encoded without referring to information on adjacent tiles or slices.

In FIG. 9, the solid lines between the tiles signifies that no reference is set to be made at the time of inter prediction between two neighboring tiles, meaning no correlation exists between them. In other words, an inter prediction of one tile does not refer to another tile, which indicates that each tile is independent. The dotted lines between the tiles signifies that there is a correlation therebetween at the time of inter prediction between two neighboring tiles. In other words, an inter prediction of one tile is set to refer to another tile to proceed the encoding, which indicates that each tile is non-independent.

Figure 13:
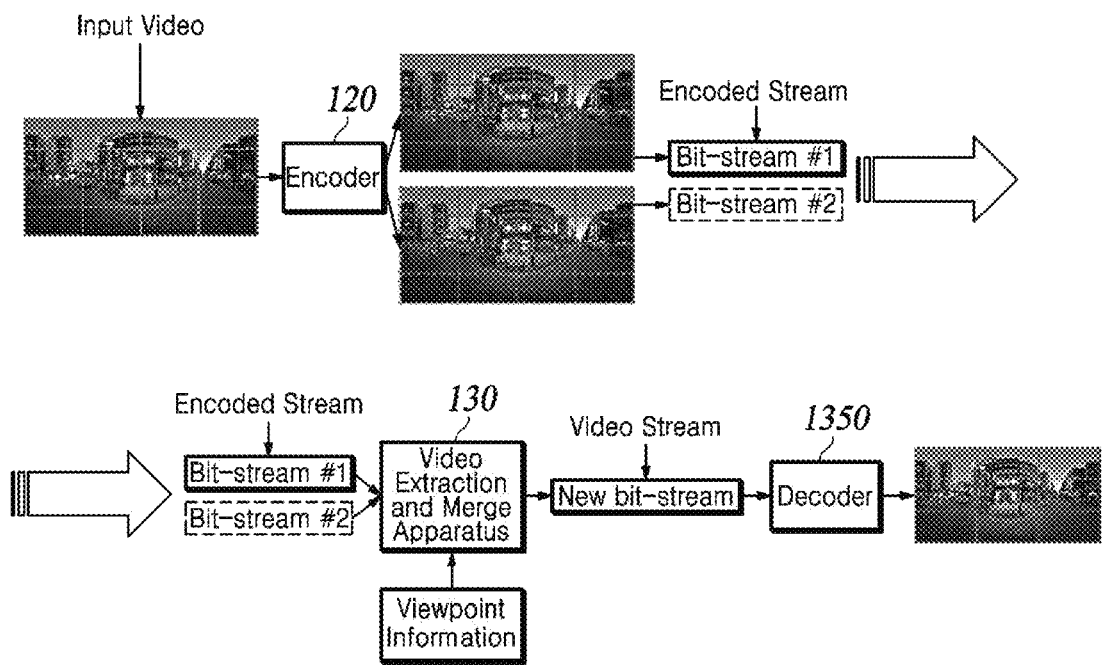
FIG. 13 shows an example process of generating high-bit rate encoded data composed of independent tiles and high-bit rate encoded data composed of non-independent tiles respectively, and extracting and merging videos by using these two encoded bitstreams.

FIG. 13 shows an example process of generating high-bit rate encoded data composed of independent tiles and high-bit rate encoded data composed of non-independent tiles respectively, and extracting and merging videos by using these two encoded bitstreams.

As shown in FIG. 13, the encoder 120 encodes one video source into encoded data 1 composed of independent tiles, and encoded data 2 composed of non-independent tiles, respectively.

Encoded data 1 composed of independent tiles means encoded data set so that none of the tiles in encoded data 1 make reference to other tiles. Encoded data 2 composed of non-independent tiles means encoded data in which every tile in encoded data 2 is allowed to be encoded by making reference to other tile. Here, when a non-independent tile refers to other tile than itself, the referenced other tile refers to a tile in a reconstructed video from the encoded stream (encoded data 1) that is encoded as independent tiles. In this case, the video extracting and merge device 130 may extract encoded data of different areas in encoded data 1 and encoded data 2 by area of importance, and merge such extracted encoded bitstreams of the different areas to generate a mixed video stream.

Figure 14:
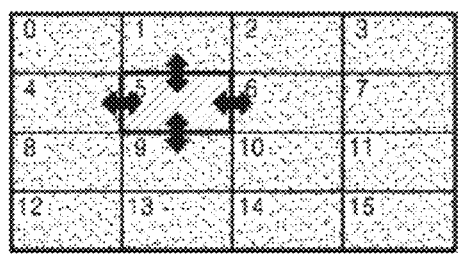
FIG. 14 shows an example tile structure of merged mixed video streams, in which tile No. 5 is extracted from encoded data 2 composed of non-independent tiles, and all other tiles are extracted from encoded data 1 composed of independent tiles.

FIG. 14 shows an example tile structure of merged mixed video streams, in which tile No. 5 is extracted from encoded data 2 composed of non-independent tiles, and all other tiles are extracted from encoded data 1 composed of independent tiles.

As shown in FIG. 14, tile No. 5, which is a non-independent tile, refers to the other tile (that is, independent tile) at the time of inter prediction. If tile No. 5 had a non-independent tile to refer in the other position, a proper prediction process cannot be carried out because the video extracting and merging process as with FIG. 14 is left with no information on the non-independent tile it referred to. Therefore, when the non-independent tile refers to other tile than itself, the tile it refers is ensured to be an independent, encoded and decoded tile.

The video extracting and merge device 130 may generate a mixed video stream by extracting data corresponding to the tile area at a specific location to be included in the mixed video stream, from encoded bitstreams that differs by the characteristics of a tile that is referred to by the tile area at the specific location in the process of inter prediction.

For example, when the mixed video stream has data to include, corresponding to the tile area at a specific in-stream location, and where the data is to be extracted from encoded data corresponding to a non-independent tile which is confirmed as referring not to itself but to another non-independent tile, the video extraction and merge apparatus 130 may engage in extracting the data located at the corresponding non-independent tile, from encoded data corresponding not to a non-independent tile but to an independent tile. In short, when the video extraction and merge apparatus 130 cannot provide a configuration for a non-independent tile to refer to an independent tile, it arranges all of the tiles in the mixed video stream to be composed of independent tiles.

Figure 15A:
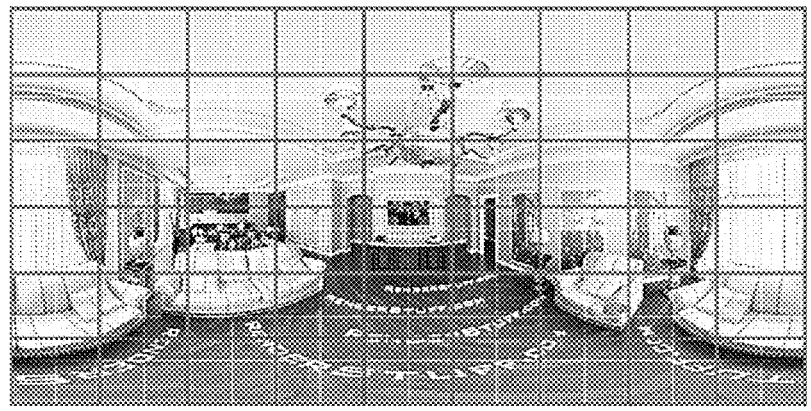
FIG. 15A is a diagram of video composed of independent tiles.
Figure 15B:
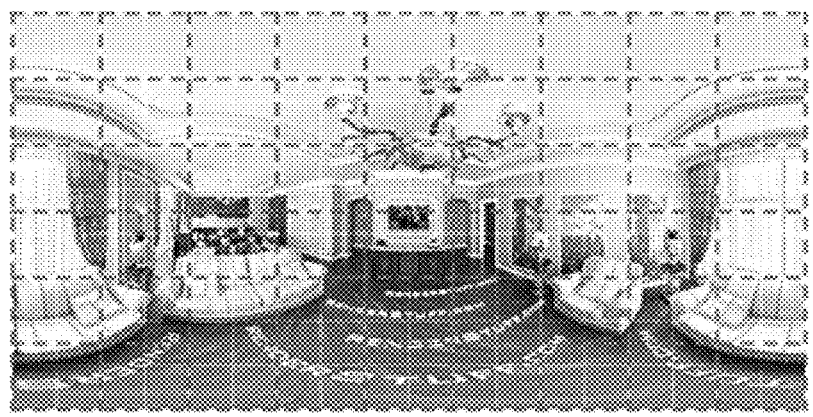
FIG. 15B is a diagram of video composed of non-independent tiles.

FIG. 15A is a diagram of a video composed of independent tiles, and FIG. 15B a video composed of non-independent tiles.

Figure 16A:
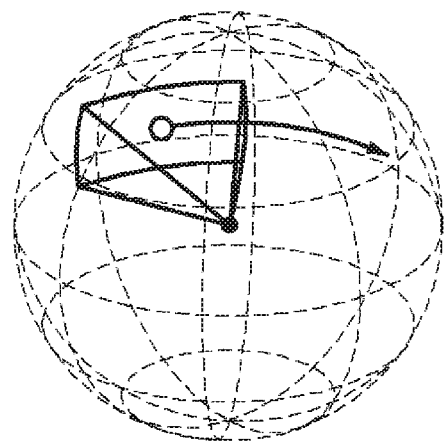
FIG. 16A is a diagram of a view point area (or display area) on a 360° sphere.
Figure 16B:
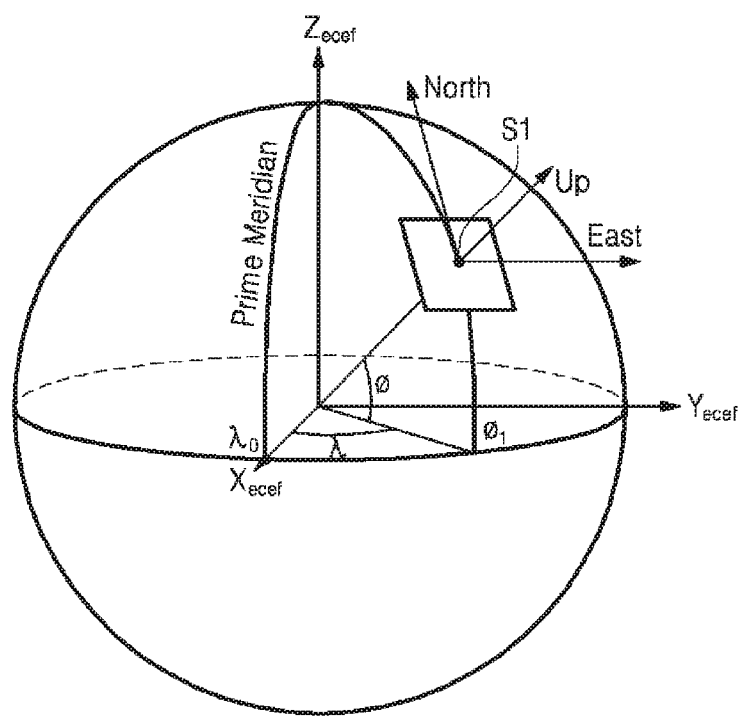
FIG. 16B is a diagram of coordinates on a 360° sphere.

FIG. 16A is a diagram of a view point area (or display area) on a 360° sphere, and FIG. 16B coordinates on a 360° sphere.

In order to map a viewpoint area on the 360° sphere to an area in a 2D video, one point on the 360° sphere may be mapped to one point (x, y) in the 2D video. The mapping relation is the same Equation 1 below, and the parameters used by Equation 1 when expressed on the 360° sphere is the same as in FIG. 16B. Equation 1 is one of methods of transforming the 3D coordinates to 2D coordinates. As shown in FIG. 16B, four parameters are used to express the coordinate value of one point S1 three-dimensionally. By using the values of these four parameters, the same 3D point may be transformed into a coordinate value at one point on the 2D video.

$$x = (\lambda - \lambda 0)\cos \varphi 1$$

$$y = (\varphi - \varphi 1) \hspace{4cm} \text{Equation 1}$$

Figure 17A:
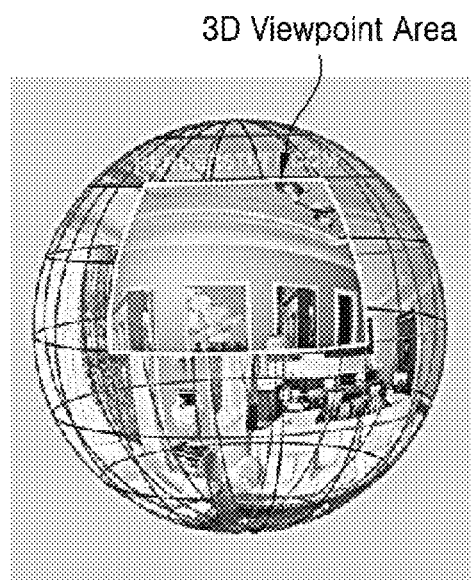
FIG. 17A is a diagram of a display area on a sphere.
Figure 17B:
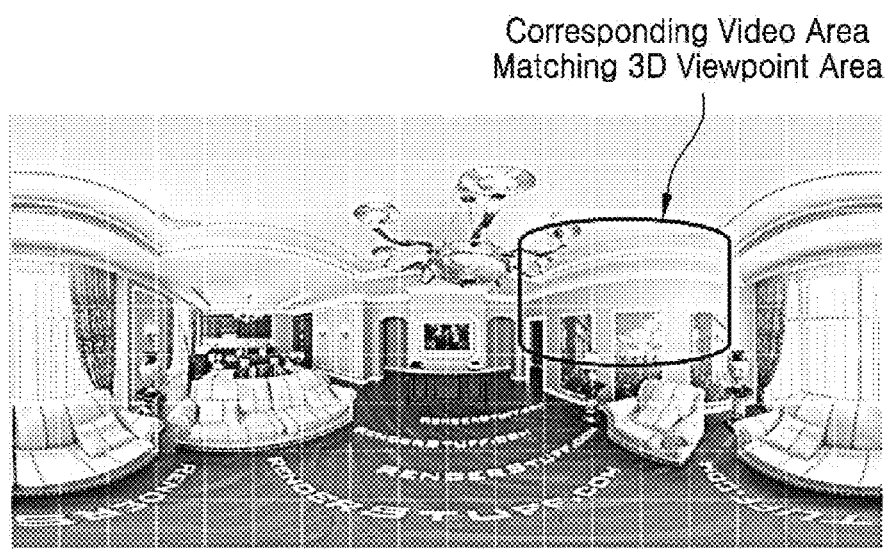
FIG. 17B is a diagram of an area in an equi-rectangular video corresponding to FIG. 17A.

Here,

λ: the longitude of the location to project

φ: the latitude of the location to project

φ1: the standard parallels (north and south of the equator)

λ0: the central meridian of the video x: the horizontal coordinate of the projected location on the video y: the vertical coordinate of the projected location on the video FIG. 17A is a diagram of a display area on a sphere, and FIG. 17B an area in an equi-rectangular video corresponding to FIG. 17A.

The area defined by the thick solid lines on the video in FIG. 17B may be obtained by transforming all the coordinate values in the display area obtained from 3D viewpoint information in the equi-rectangular method which is a representative method of two-dimensionally transforming thereof into coordinate values on the video. FIG. 17B shows an example specific area on the video corresponding to a certain area on the sphere. The two-dimensionally transformed specific area on the video takes its shape depending on which part of the 3D video shows in the specific area on the video corresponding to the 3D viewpoint area. For example, when the area on the video corresponding to the 3D viewpoint is the area corresponding to the top or the bottom on the sphere, the shape of the corresponding area on the 2D video of 17B shows a great change.

The video extraction and merge apparatus 130 may utilize the viewpoint information to select a specific area on the video video, and select a plurality of tiles including the specific area, to reconstruct the mixed video stream. The viewpoint information input to the video extraction and merge apparatus 130 may be 3D coordinate information or may be previously mapped 2D coordinate information.

Figure 18:
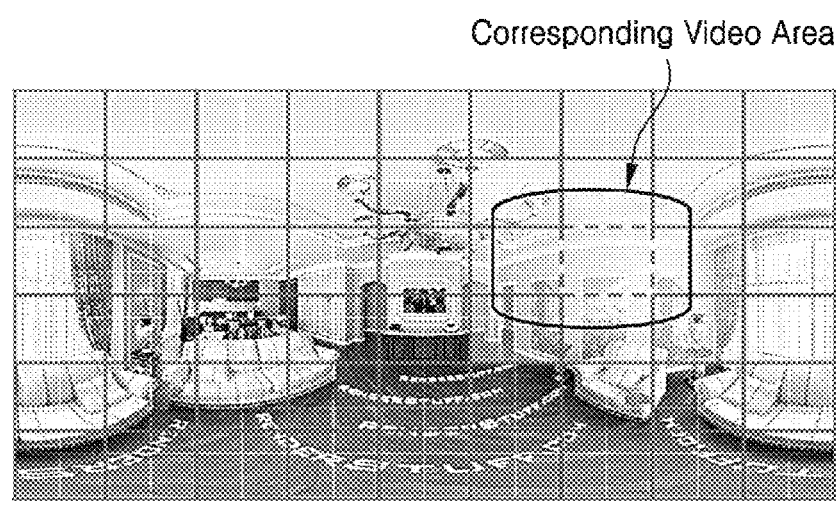
FIG. 18 is a diagram of an equi-rectangular displayed video and the tiles included in the video.

In accord with the display area (3D viewpoint area, i.e., area of importance) as in FIG. 17A, encoded data of the tile corresponding to that area of importance are extracted from the encoded bitstreams as in FIGS. 15A and 15B, to construct such a mixed video stream as one in FIG. 18.

FIG. 18 is a diagram of the video of an area of importance on an equi-rectangular video, and the tiles included in the whole video. FIG. 18 shows nine tiles corresponding to the area of importance among the multiple tiles in the whole video.

Once informed with the display area and the tile structure, the video extraction and merge apparatus 130 can recognize the position and structure of the tile including the display area. In addition, the video extraction and merge apparatus 130 may arrange, among the nine tiles (their corresponding areas on the video) corresponding to the display area, the tiles existing on the boundary portion of the display area to be composed of independent tiles, and central tiles encompassed by the display area but not located on the boundary portion to be composed of non-independent tiles.

The video extraction and merge apparatus 130 may mix, for the purpose of decoding the whole video, independent tiles and non-independent tiles as in FIG. 18 and thereby construct a mixed video stream inclusive of all the constituent tiles of a single video mixed. Alternatively, it may construct, for the purpose of partial decoding, a mixed video stream including none other than the nine tiles corresponding to the display area, and transmit the mixed video stream to the stream delivery apparatus 140.

In FIG. 13, the decoder 1350 decodes a reconstructed bitstream.

The tiles, as being independent from each other in the video, may be simply and thus advantageously configured, but at a cost of deteriorated compression performance and visible discrepancy at the boundary of the tiles. These deficiencies can be made up for by configuring some of tiles constituting one video with non-dependent tiles. Therefor, the video extraction and merge apparatus 130 may generate and insert additional information (SEI) of the structure of the tiles into the bitstream.

The video extraction and merge apparatus 130 calculates the syntax values of Table 1 and Table 2 to generate the additional information (SEI), and then inserts them into the mixed video stream corresponding to the set area of importance.

The decoder 1350 may read the SEI information from the mixed video stream to obtain the position and configuration information of the tile related to the display area within the video and then decode the whole video, and it may be responsive to a mixed video stream transmitted including only the display area, for carrying out partial decoding only on the display area.

All scenarios included in this disclosure can deal with possible inavailability of viewpoint information to the receiving end by allowing the encoder on the transmitting end to designate a default initial display position. The encoder may add the initial display position information to the header information including the SEI. The initial display position information is the coordinate value on the video, which is the same as the syntax in Table 6. In addition, the initial display position information may have the same form as the syntaxes in Table 1 and Table 2 for the tile sets included in the encoded data as shown in FIG. 3.

TABLE 6 u_pos
v_pos

When the user's viewpoint information is not input, the video extraction and merge apparatus 130 may reconstruct the mixed video stream based on the additional information (default initial display position) transmitted by the encoder. In addition, when the viewpoint information is normally input, the video extraction and merge apparatus 130 reconstructs the mixed video stream based on the input viewpoint information.

When composing the tiles corresponding to the display area by using the input viewpoint information, the video extraction and merge apparatus 130 may do the same with the minimum number of tiles by setting the tiles corresponding to typically input viewpoint coordinates and their adjacent tiles as the display area. In addition, the video extraction and merge apparatus 130 may, in consideration of the movement of the user's viewpoint, compose tiles corresponding to the input viewpoint coordinates, and tiles corresponding to an expanded area beyond their adjacent tile area. At this time, scaling factor may be used for the degree of expansion. For example, with the scaling factor of 1.5, the expanded area by 1.5 times the existing display area may be set as the display area. In addition, the video extraction and merge apparatus 130 may compose an expanded area by using offset. For example, when offset is set to 100, an expanded area may be set by extending the existing display area by 100 along the horizontal axis as well as the vertical axis. This offset may also be specified for the horizontal axis and the vertical axis, separately.

Figure 10:
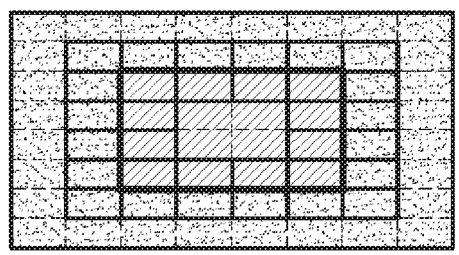
FIG. 10 is conceptual diagrams (a) to (d) of a mixed video stream structured according to some embodiments of the present disclosure, based on the encoded data of FIG. 9 from (a) to (d).
Figure 10:
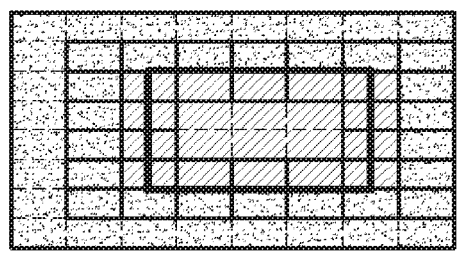
Figure 10:
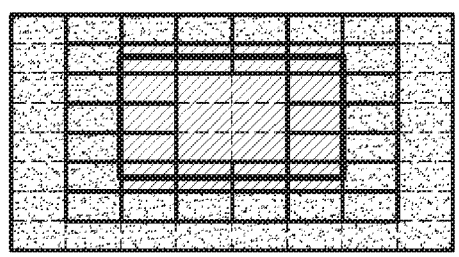
Figure 10:
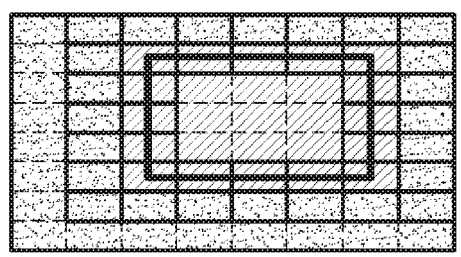

FIG. 10 is conceptual diagrams (a) to (d) of a mixed video stream structured according to some embodiments of the present disclosure, based on the encoded data of FIG. 9 from (a) to (d).

The encoding rates of the whole video according to the tile structures shown FIG. 10 from (a) to (d) may be calculated as 10 Mbps, 11 Mbps, 11 Mbps, and 12 Mbps, respectively. It can be seen that about 50% decrease in bit rate is achieved as compared with the case of encoding all the tiles at a bit rate of 25 Mbps.

As shown in FIG. 10 from (a) to (d), an adjacent area to the boundary between the area of importance and other areas than the area of importance, may be extracted by the video generation unit 440 from the encoded data having the bit rate corresponding to the importance of that adjacent area out of the encoded bitstreams belonging to the second encoded data group (e.g., (a) and (b) in FIG. 9). For example, a tile existing at a boundary between a high bit rate area and a low bit rate area may be composed of independent tiles.

A nonadjacent area to the boundary between the area of importance and other areas than the area of importance, may be extracted from the encoded data having the bit rate corresponding to the importance of that nonadjacent area out of the encoded bitstreams belonging to the first encoded data group (e.g., (c) and (d) videos in FIG. 9). For example, a tile that exists outside the boundary between a high bit rate area and a low bit rate area may be composed of non-independent tiles. This effects an improved compression performance.

Figure 11:
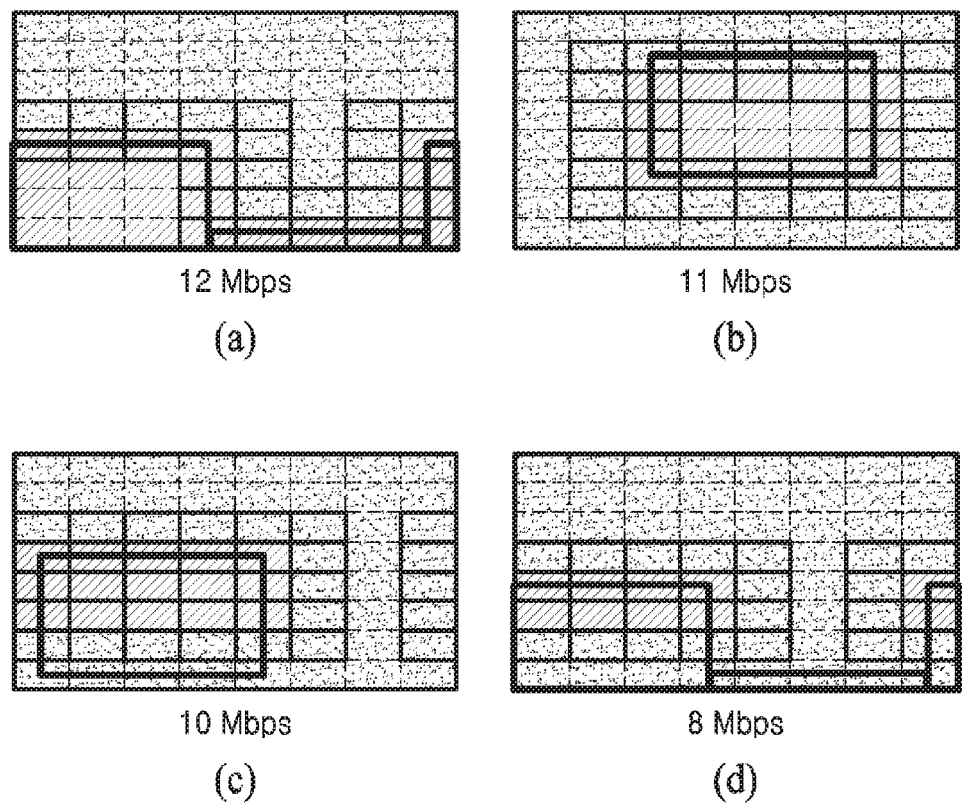
FIG. 11 is conceptual diagrams (a) to (d) of a mixed video stream structured according to another embodiment of the present disclosure, based on the encoded data of FIG. 9 from (a) to (d).

FIG. 11 is conceptual diagrams (a) to (d) of a mixed video stream structured according to another embodiment of the present disclosure, based on the encoded data of FIG. 9 from (a) to (d).

Specifically, FIG. 11 from (a) to (d) show the structure of a mixed video stream generated on the basis of the area of importance set in consideration of the above-mentioned feature of the 360° video. The encoding rates of the whole video by the tile structures shown in FIG. 11 from (a) to (d) are 12 Mbps, 11 Mbps, 10 Mbps and 8 Mbps, respectively. This exhibits about 50% decrease in bit rate as compared with the case of encoding all the tiles at a bit rate of 25 Mbps.

Composing tiles as shown in FIG. 10 from (a) to (d) and as in FIG. 11 from (a) to (d) can improve compression performance, yet at a cost of visible discrepancy at the boundary between the tiles having different bit rates.

In this way, the video generation unit 440 according to yet another embodiment of the present disclosure composes tiles corresponding to the high bit rate area and tiles corresponding to the low bit rate area in advance based on a preset position of importance in the video, and encodes the composed tiles to generate a mixed video stream. In addition, the video generation unit 440 composes, based on various preset positions of importance, tiles corresponding to the high-bit rate area and tiles corresponding to the low bit rate area, both areas corresponding to the high bit rate and low bit rate areas respectively, to generate a mixed video stream. The multichannel stream transmission unit 450 transmits various types of mixed video streams to the stream delivery apparatus 140 based on the various preset positions of importance. The stream delivery apparatus 140 acquires information on the actual position of importance from the user terminal apparatus 150 and the like, selects and transmits its matching mixed video stream from among the various types of mixed video streams, to the user terminal apparatus 150.

Specifically, the encoded data receiving unit 410 according to at least one embodiment receives, from the encoder 120, a plurality of encoded bitstreams having been encoded separately by multiple areas corresponding to the input video and respectively at different bit rates that differ by the importance of multiple corresponding areas.

The stream delivery apparatus 140 according to at least one embodiment receives high-importance position information of an input video source from an external apparatus (not shown), and generates, among the plurality of mixed video streams, a mixed video stream that matches with the relevant high-importance position information.

In at least one embodiment, the extraction and merge apparatus 130 prepares a preset number of positions of importance, to generate a plurality of mixed video streams composed differently by the respective preset positions of importance. The stream delivery apparatus 140 selects, from the plurality of mixed video streams generated, a mixed video stream that matches with an actual position of importance (i.e., high-importance position information), and transmits the selected mixed video stream to the user terminal apparatus 150.

The high-importance position information may include at least one of the user's viewpoint position of the input video source and one or more object positions detected from the input video source.

The preset number of positions of importance may be set in consideration of at least one of the size of tiles or slices constituting the input video source, the number of tiles or slices, and the resolution of the input video source.

Figure 12:
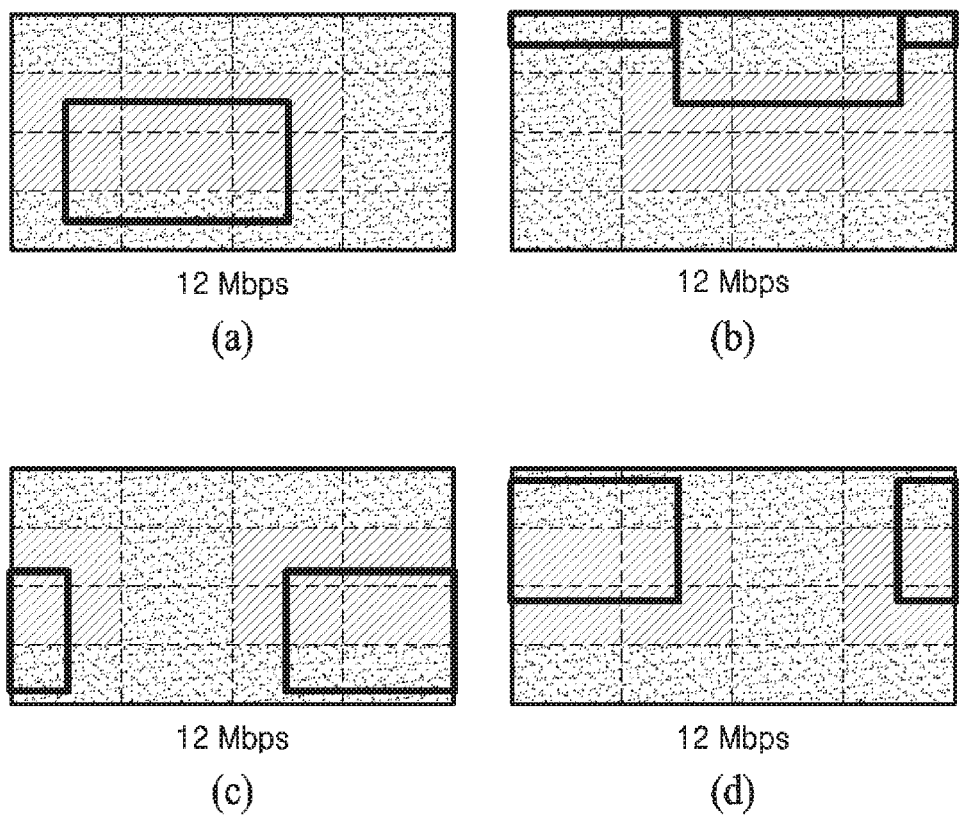
FIG. 12 is conceptual diagrams (a) to (d) of a mixed video stream structured according to yet another embodiment of the present disclosure.

FIG. 12 is conceptual diagrams (a) to (d) of a mixed video stream structured according to yet another embodiment of the present disclosure.

Positions of importance shown in FIG. 12 from (a) to (d) are preset positions of importance that represent four different instances of the user's viewpoint positions, when an input video picture composed of 16 tiles of the same size is configured to have four tiles arranged in a row. As shown in FIG. 12 from (a) to (d), all the tiles constituting encoded bitstreams are composed of non-independent tiles, in order to address the discrepancy issue between the tiles.

Another approach is to use no tiles, and instead set the input source as an encoding unit, to generate a separate encoded bitstream for each of areas of importance shown in FIG. 12 from (a) to (d). In other words, different respective encoded bitstreams may be generated as many as a predesignated number for each position of the high-importance areas. For example, if the predesignated number corresponding to the position of the high-importance areas is 16, 16 encoded bitstreams are generated commensurate with the predesignated high-importance areas.

The encoding rates of mixed video streams by the tile compositions shown in FIG. 12 from (a) to (d) may be calculated as 12 Mbps, 12 Mbps, 12 Mbps and 12 Mbps, respectively. This can provide an estimated decrease in bit rate by about 50% as compared with the case of encoding all the tiles in the video at a bit rate of 25 Mbps.

Figure 19:
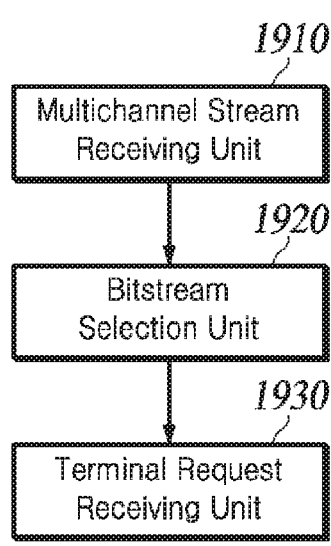
FIG. 19 is a block diagram of a stream delivery apparatus 140 according to some embodiments.

FIG. 19 is a block diagram of a stream delivery apparatus 140 according to some embodiments.

The stream delivery apparatus 140 according to at least one embodiment includes a multichannel stream receiving unit 1910, a bitstream selection unit 1920 and a terminal request receiving unit 1930.

The multichannel stream receiving unit 1910 receives multichannel mixed video streams generated in various profiles, respectively, according to the tile-based importance.

The bitstream selection unit 1920 receives the high-importance position information from the user terminal apparatus 150, selects a mixed video stream corresponding to conditions of the user terminal apparatus 150, including the physical position corresponding to the high-importance position information, the network QoS, the radio wave strength of the user terminal apparatus 150, etc., and transmits the selected mixed video stream to the user terminal apparatus 150.

The terminal request receiving unit 1930 receives the conditions of the user terminal apparatus 150 such as the position of importance, network QoS and radio wave strength thereof.

The terminal request receiving unit 1930 of at least one embodiment receives high-importance position information of an input video source from an external apparatus (not shown), and the bitstream selecting unit 1920 selects, based on preset positions of importance, encoded data that matches received high-importance position information from a predetermined number of encoded bitstreams (e.g., FIG. 12 from (a) to (d)).

For example, when high-importance position information of the input video source, which is received by the terminal request receiving unit 1930 from the external apparatus (not shown), matches the position of importance marked in FIG. 12 (*a*), the bitstream selection unit 1920 selects the mixed video stream shown in FIG. 12 (*a*) as the mixed video stream corresponding to the high-importance position information.

The bitstream selection unit 1920 may receive various versions of streams transmitted from the video extraction and merge apparatus 130 and provide them in a pull or push method.

The push method may include determining the video quality or bit rate for each tile around the area requested by the user terminal apparatus 150 or the main object, or predetermining the bit rate for each tile around the main area after fixing thereof, and transmitting the resulting bit rate.

The pull method may include first transmitting meta information such as a preset media presentation description (MPD) to the user terminal apparatus 150, and subsequently sending the stream delivery apparatus 140 a request by the user terminal apparatus 150 for the url corresponding to the mapped result of mapping to the desired position of viewing from meta information. The bitstream selection unit 1920 is responsive to the video url received from the user terminal apparatus 150 for selecting the relevant mixed video stream among a plurality of mixed video streams and transmitting the selected mixed video stream to the user terminal apparatus 150.

Figure 20:
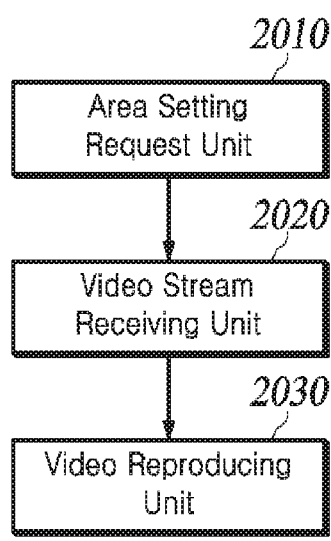
FIG. 20 is a block diagram of a user terminal apparatus 150 according to some embodiments.

FIG. 20 is a block diagram of a user terminal apparatus 150 according to some embodiments.

The user terminal apparatus 150 according to at least one embodiment includes an area setting request unit 2010, a video stream receiving unit 2020 and a video reproducing unit 2030. The area setting request unit 2010 in some embodiments is adapted to determine a viewing position from position information offered by a gyro sensor and the like, and to transmit the position information to the stream delivery apparatus 140 or transmit the identification of a pre-arranged stream to the stream delivery apparatus 140, thereby requesting the relevant mixed video stream. Alternatively, the area setting request unit 2010 is adapted to determine which stream the coordinates of the line of sight correspond to, by using preset MPD information, and to transmit the url of the relevant mixed video stream, thereby directly requesting the relevant mixed video stream. For example, the range of areas of importance may be discovered from the MPD information through information on high bit rate areas, including the size of the area, the start position (x, y), the size of the tile, the number of tiles, etc. Further, every position change of the viewer may initiate the request for the mixed video stream at the url corresponding to the relevant area of importance.

The video stream receiving unit 2020 receives, from the stream delivery apparatus 140, the mixed video stream corresponding to the area setting request having been transmitted to the stream delivery apparatus 140.

The video reproducing unit 2030 decodes and reproduces the received mixed video stream.

Hereinafter, with reference to FIGS. 21 and 22, methods of generating a video bitstream according to some embodiments of the present disclosure will be described.

Figure 21:
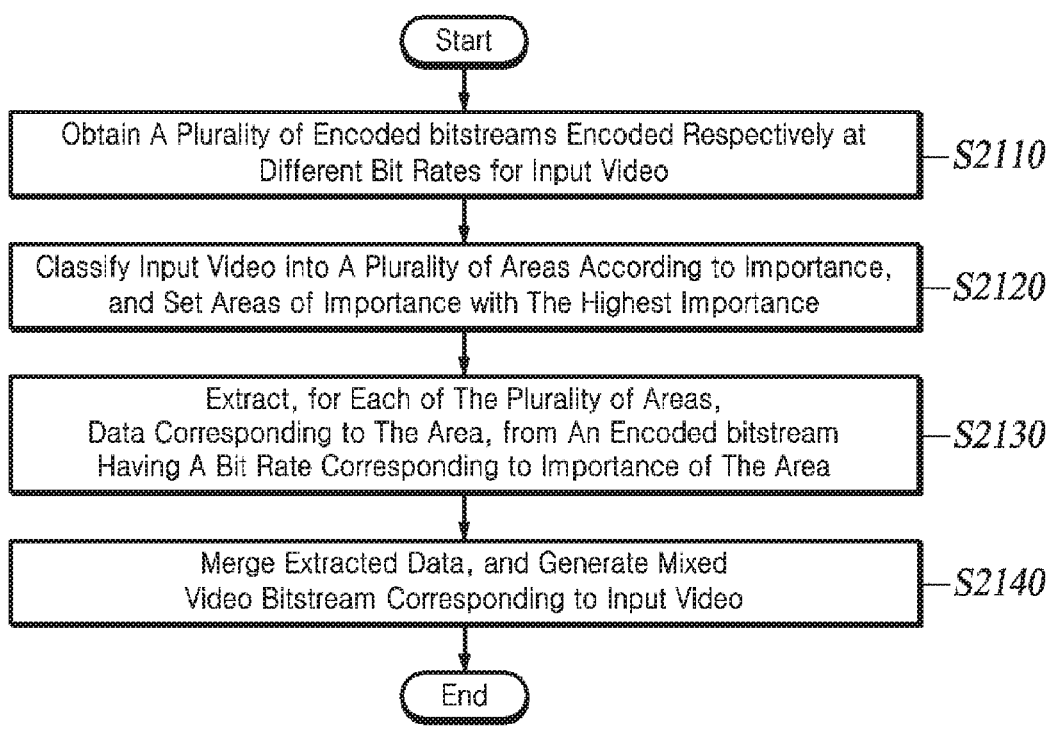
FIG. 21 is a flowchart of a method of generating a mixed video stream according to some embodiments of the present disclosure.

FIG. 21 is a flowchart of a method of generating a mixed video stream according to some embodiments of the present disclosure.

In order to generate a mixed video stream for streaming a high-resolution video, a plurality of encoded bitstreams respectively encoded at different bit rates is obtained for one input video source (in Step S2110). For example, this step may generate encoded bitstreams encoded at a low video quality, i.e., low bit rate (e.g., 5 Mbps), and encoded bitstreams encoded at a high video quality, i.e., high bit rate (e.g., 25 Mbps). Step S2110 corresponds to the operation of the encoder 120, and a detailed description thereof is omitted.

Step S2120 sets an area of importance having the highest importance level from the input video source, classifies the input video source into a plurality of areas according to the degree of importance. Here, an area of importance means an area to be extracted from encoded data having been encoded at the highest bit rate. The degree of importance may be determined from the above-mentioned high-importance position information, and it can be seen that in one input source, the closer the position of an area to the user's viewpoint position (or the object position in the input video source), the higher the importance of the area.

More specifically, Step S2120 may obtain user's viewpoint position candidates of the input video source, and set one or more areas included within a certain range from the user's viewpoint position candidates as areas of importance, and classify a plurality of areas based on their distance from the user's viewpoint position candidates.

When setting the area of importance based on the user's viewpoint position candidates, the user's viewpoint position may be periodically obtained for checking whether there is movement of the previously obtained viewpoint position, a detected movement may be reflected to reset the area of importance.

In addition, Step S2120 may obtain one or more object positions detected from the input video source, set one or more areas included within a certain range from the one or more object positions as areas of importance, and classify a plurality of areas based on their distance from the one or more object positions. Here, the object positions may be object position candidates obtained by an object detection algorithm.

When setting area of importance based on the object position, multiple objects possibly included in the input video source may cause multiple areas of importance to be set.

In setting areas of importance, there are points to consider in addition to the user's viewpoint position and the object position, depending on the characteristics of the input video source. For example, when the input video source is a 360° video, depending on which part of the video the area of importance is located, another area may need to be added as the area of importance, or a preset area of importance may need to be reduced.

More specifically, a 360° video has a feature that when in playback, both ends of the video may be seen to be in contact with each other. In other words, one may see that the upper opposite ends of the video touch each other, or that the lower opposite ends of the video touch each other. This is because the video is distorted or warped in the process of stitching which combines the videos captured by multiple cameras.

Therefore, Step S2120, when the area set as the area of importance includes one upper edge area or one lower edge area of the input video source, may also set the other upper edge area or other lower edge area of the input video source as the area of importance. The aforementioned stitching process causes the distortion (warping) of a 360° video to occur in the upper areas and the lower areas of a video rather than in the center part of the video, and information redundancy occurs in the upper areas and the lower areas. In general, the upper and lower areas of a 360° video generally present the sky and the ground, respectively, which explains the higher importance of a video being often present in its central area than its upper and lower areas.

Therefore, Step S2120, when areas of the highest importance include at least one of an upper area and a lower area of the input video source, may exclude the corresponding upper area and the lower area from the area of the highest importance to have the remaining area set as the area of importance.

The number of tiles belonging to the plurality of areas classified by Step S2120 may differ according to the size of the tile and the position of the area of importance.

According to the method in some embodiments, Step S2110 and Step S2120 are followed by extracting each of the plurality of areas from among a plurality of encoded bitstreams, and more particularly from the encoded bitstreams each having a bit rate corresponding to the importance of each of the plurality of areas (S2130).

Specifically, Step S2130 may extract the area of importance among the plurality of areas, from the highest-bit rate encoded data among the plurality of encoded bitstreams, and extract the area of lesser importance among the plurality of areas, from the lower-bit rate encoded data.

Step S2130, considering that an area of importance can move in real time, may extract up to the adjacent area to the area of importance from the highest-bit rate encoded data among the plurality of encoded bitstreams.

Step S2140 merges the extracted areas to generate a mixed video stream corresponding to the area of importance.

Step S2120 to Step S2140 correspond to the operation of the video extraction and merge apparatus 130 according to some embodiments of the present disclosure, so a detailed description thereof is omitted.

Figure 22:
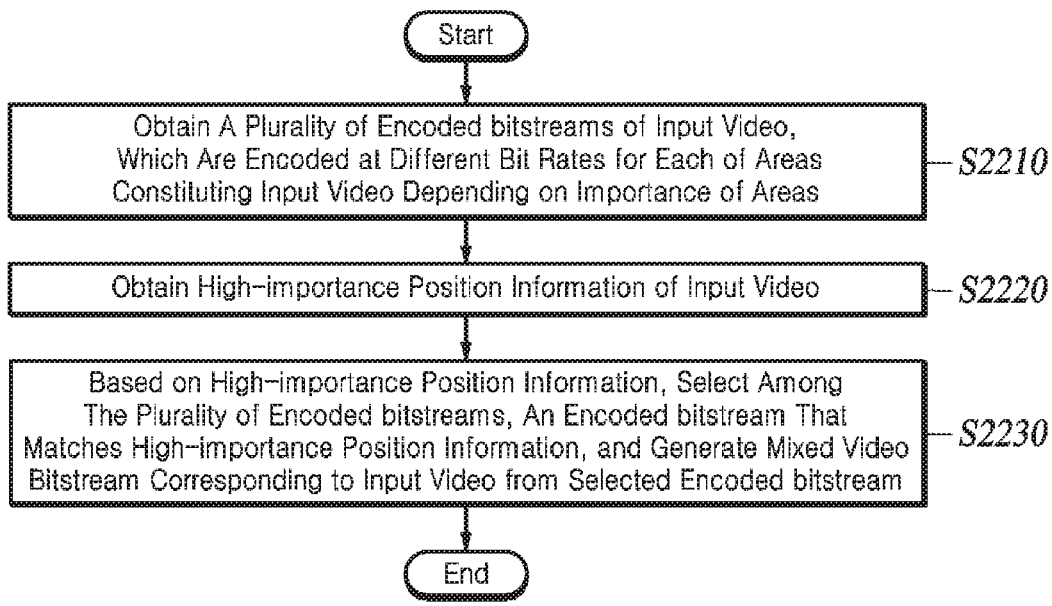
FIG. 22 is a flowchart of a method of generating a mixed video stream according to another embodiment of the present disclosure.

FIG. 22 is a flowchart of a method of generating a mixed video stream according to another embodiment of the present disclosure.

The method of at least one embodiment obtains encoded bitstreams having been encoded separately by multiple areas constituting the input video and respectively at different bit rates that differ by the importance of multiple constituent areas (S2210), and obtains high-importance position information from a terminal (S2220).

Step S2230 selects, using the encoded bitstreams and the high-importance position information obtained by Step S2210 and Step S2220, a mixed video stream that matches the high-importance position information among the plurality of encoded bitstreams, based on the high-importance position information.

The method in at least one embodiment may include preparing multiple areas respectively for a preset number of positions of importance, obviating the need for a separate setting of positions of importance, and selecting, from encoded bitstreams having been encoded respectively from input video sources composed differently by the respective preset positions of importance, a mixed video stream that matches with an actual position of importance (i.e., high-importance position information), and transmitting the selected mixed video stream to the user terminal apparatus 150.

The high-importance position information may include at least one of the user's viewpoint position of the input video source and one or more object positions detected from the input video source.

The preset number of positions of importance may be set in consideration of at least one of the size of tiles or slices constituting the input video source, the number of tiles or slices, and the resolution of the input video source.

Step S2210 corresponds to the operation of the encoded data receiving unit 410 according to some embodiments, and Step S2220 and Step S2230 correspond to the operation of the video generation unit 440, and thus detailed explanations thereof are omitted.

Although Step S2110 to Step S2140, and Step S2210 to Step S2230 in FIGS. 21 and 22 are described to be sequentially performed, they are not necessarily so limited. In other words, the steps illustrated in FIGS. 21 and 22 are subject to changes in sequence when implemented, or two or more of the steps can be performed in parallel, without departing from the gist and the nature of the embodiments of the present disclosure, and hence the steps in FIGS. 21 and 22 are not limited to the illustrated chronological sequences. As described above, the method of generating the video bitstream according to some embodiments described in FIGS. 21 and 22 can be implemented as a program and recorded on a computer-readable recording medium. The computer-readable recording medium, on which the program for implementing the method of generating the video bitstream according to some embodiments, includes any type of recording device on which data that can be read by a computer system are recordable.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

INDUSTRIAL APPLICABILITY

At least one embodiment of the present disclosure is applicable to the field of video encoding for streaming high-definition video contents, and is capable of compressing videos efficiently by reducing the amount of data to be processed at the time of streaming, to provide such useful effects as described above.

REFERENCE NUMERALS

100: Video bitstream generation system
110: Stitcher
120: Encoder
130: Video extraction and merge apparatus
140: Stream delivery apparatus 150: User terminal apparatus
410: Encoded data receiving unit
420: Input stream synchronization unit
430: Syntax parsing unit
440: Video generation unit
450: Multichannel stream transmission unit
1910: Multichannel stream receiving unit
1920: Bitstream selection unit
1930: Terminal request receiving unit
2010: Area setting request unit
2020: Video stream receiving unit
2030: Video reproducing unit

The invention claimed is:

1. A method of generating a video stream of an input video, the method comprising:
receiving a plurality of encoded bitstreams encoded at different bit rates for an input video, respectively, wherein each of the plurality of encoded bitstreams includes encoded data of one or more tiles for a whole region of each frame of the input video and is encoded without allowing reference between adjacent tiles during an inter prediction;
encoding position information indicating where a display area is to be displayed;
extracting encoded data of one or more tiles corresponding to the display area selected from one of the plurality of encoded bitstreams, wherein the extracted encoded data is encoded at a first bitrate among the different bit rates; and
generating a bitstream including at least the encoded data of the display area and the position information.

2. The method of claim 1, wherein remaining areas other than the display area in the input video are not included into the bitstream.

3. The method of claim 1, further comprising:
extracting encoded data corresponding to remaining areas other than the display area in the input video are encoded at a second bitrate, among the different bit rates, which is lower than the first bitrate,
wherein the bitstream is generated by merging the encoded data of the display area and the encoded data of the remaining areas.

4. The method of claim 1, wherein the position information includes indexes for respectively indicating a top-left tile and a bottom-right tile among tiles included in each of a plurality of tile sets which composes the display area.

5. The method of claim 4, wherein the position information further includes at least one of the number of the plurality of tile sets or identification of each of the plurality of tile sets.

6. The method of claim 1, wherein the display area is determined based on a user's viewpoint or one or more object positions in the input video.

7. The method of claim 6, wherein the display area is set by expanding, by a predetermined scale factor or offset.

8. The method of claim 1, wherein the position information is included in the bitstream as supplemental enhancement information (SEI).

9. A video stream generating apparatus, comprising:
a memory; and
a processor configured to
receive a plurality of encoded bitstreams encoded at different bit rates for an input video, respectively, wherein each of the plurality of encoded bitstreams includes encoded data of one or more tiles for a whole region of each frame of the input video and is encoded without allowing reference between adjacent tiles during an inter prediction,
encode position information indicating where a display area is to be displayed,
extract encoded data of one or more tiles corresponding to the display area selected from one of the plurality of encoded bitstreams, wherein the extracted encoded data is encoded at a first bitrate among the different bit rates, and
generate a bitstream including at least the encoded data of the display area and the position information.

10. The apparatus of claim 9, wherein encoded data of remaining areas other than the display area in the input video are not included into the bitstream.

11. The apparatus of claim 9, wherein the processor is configured to
extract encoded data corresponding to remaining areas other than the display area in the input video are encoded at a second bitrate, among the different bit rates, which is lower than the first bitrate, and
generate the bitstream by merging the encoded data of the display area and the encoded data of the remaining areas.

12. The apparatus of claim 9, wherein the position information includes indexes for respectively indicating a top-left tile and a bottom-right tile among tiles included in each of a plurality of tile sets which composes the display area.

13. The apparatus of claim 12, wherein the position information further includes at least one of the number of the plurality of tile sets or identification of each of the plurality of tile sets.

14. The apparatus of claim 9, wherein the processor is configured to determine the display area based on a user's viewpoint or one or more object positions in the input video.

15. The apparatus of claim 14, wherein the processor is configured to determine the display area by expanding, by a predetermined scale factor or offset.

16. The apparatus of claim 9, wherein the position information is included in the bitstream as supplemental enhancement information (SEI).

* * * * *